United States Patent
German, Jr. et al.

(10) Patent No.: US 10,493,733 B2
(45) Date of Patent: Dec. 3, 2019

(54) POLYOLEFIN FILMS

(71) Applicant: ExxonMobil Chemical Patents Inc., Baytown, TX (US)

(72) Inventors: Paul M. German, Jr., Friendswood, TX (US); Wen Li, Houston, TX (US); Jianya Cheng, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/518,269

(22) PCT Filed: Sep. 25, 2015

(86) PCT No.: PCT/US2015/052214
§ 371 (c)(1),
(2) Date: Apr. 11, 2017

(87) PCT Pub. No.: WO2016/081065
PCT Pub. Date: May 26, 2016

(65) Prior Publication Data
US 2017/0305124 A1    Oct. 26, 2017

Related U.S. Application Data

(60) Provisional application No. 62/082,896, filed on Nov. 21, 2014.

(30) Foreign Application Priority Data

Jan. 14, 2015 (EP) ..................... 15151052

(51) Int. Cl.
*B32B 27/08* (2006.01)
*B32B 27/32* (2006.01)
*C08F 10/02* (2006.01)
*C08F 10/06* (2006.01)

(52) U.S. Cl.
CPC .............. *B32B 27/08* (2013.01); *B32B 27/32* (2013.01); *C08F 10/02* (2013.01); *C08F 10/06* (2013.01); *B32B 2250/03* (2013.01); *B32B 2250/242* (2013.01); *B32B 2250/40* (2013.01); *B32B 2270/00* (2013.01); *B32B 2307/51* (2013.01); *B32B 2307/54* (2013.01); *B32B 2553/00* (2013.01)

(58) Field of Classification Search
CPC ..... B32B 27/08; B32B 27/32; B32B 2250/03; B32B 2250/242; B32B 2250/40; B32B 2307/51; B32B 2307/54; B32B 2553/00; B32B 2270/00; C08F 10/06; C08F 10/02
See application file for complete search history.

(56) References Cited

U.S. PATENT DOCUMENTS

| | | |
|---|---|---|
| 5,752,362 A | 5/1998 | Eichbauer |
| 5,907,942 A | 6/1999 | Eichbauer |
| 6,602,598 B1 * | 8/2003 | Simpson et al. ........ B32B 27/32 428/213 |
| 2003/0188536 A1 | 10/2003 | Mittricker et al. |
| 2008/0311368 A1 | 12/2008 | Tukachinsky |

FOREIGN PATENT DOCUMENTS

WO    2014/088791 A1    6/2014

* cited by examiner

*Primary Examiner* — Nathan M Nutter

(57) ABSTRACT

This disclosure relates to films particularly suitable for stretch hood applications. More particularly, this disclosure relates to multi-layer films particularly suitable for stretch hood applications comprising an inner layer that includes a blend of a propylene-based elastomer and a polyethylene having long-chain branching.

16 Claims, 5 Drawing Sheets

POLYOLEFIN FILMS

PRIORITY CLAIM

This application is a National Phase Application which claims priority to and the benefit of PCT/US2015/052214, filed Sep. 25, 2015, U.S. Provisional Application Ser. No. 62/082,896, filed Nov. 21, 2014, and EP Application No. 15151052.6, filed Jan. 14, 2015, which are incorporated herein by reference in their entirety.

FIELD OF THE INVENTION

This disclosure relates to films comprising one or more polyolefins, particularly to films suitable for stretch hood applications. More particularly, this disclosure relates to multi-layer films particularly suitable for stretch hood applications comprising one or more intermediate layers comprising an ethylene-based polymer and a propylene-based elastomer.

BACKGROUND OF THE INVENTION

In commercial packaging art, individual articles as well as bundles of articles, including bundles of articles on pallets, are frequently packaged using so called stretch cling film in a stretch wrapping technique. In the stretch wrapping technique, a thin web of film is stretched and applied under tension around the articles to be wrapped or bundled. After wrapping is complete, the film attempts to relax and thus applies a compressive force on the bundled articles prohibiting movement. It is desired that the stretch film have some inherent cling such that it will adhere to itself, and prevent relaxation back to its unstretched state so that the film will not unwrap and cause slippage of the stretched overlaid film layers. Given the importance and usefulness of these films, improvements in this area are highly desirable. Background references included are U.S. Pat. Nos. 5,752,362, 5,907,942, and 6,602,598; Application Publication Nos. 2003/1188536, 2008/311368; and WO 2014/088,791.

SUMMARY OF THE INVENTION

Aspects of the invention are based in part on the discovery that the combination of particular polymers in the inner layer of a multilayer film provide films with an improved combination of properties, particularly for stretch hood applications. The inner layer of the multilayer films typically includes a propylene-based elastomer and an ethylene-based polymer. The ethylene-based polymer has a Composition Distribution Breadth Index (CDBI) of at least 70%. The ethylene-based polymer possesses at least some amount of long-chain branching as indicated by a $g'_{vis}$ value of 0.85 to 0.98. Some such films are characterized by a MD 1% Secant Modulus of ≥137 MPa.

In other aspects the invention is based in part on the discovery that particular inner layer compositions allow films to be made under process conditions better balancing MD and TD forces in the film during fabrication. Thus, aspects of the invention provide a method of making a multilayer film, comprising a) providing first and second outer layers comprising 80 to 100 wt % of a first ethylene-based polymer; and b) providing an inner layer interposing the first and second outer layers, the inner layer comprising 5.0 to 30.0 wt % of a first propylene-based elastomer and 70.0 to 95.0 wt % a second ethylene-based polymer, said second ethylene-based polymer having a Composition Distribution Breadth Index (CDBI) of at least 70% and a $g'_{vis}$ of 0.85 to 0.98; and c) forming the inner layer and first and second outer layers into a film at an air-ring height to die-diameter ratio of 1.0 to 2.0.

DETAILED DESCRIPTION OF EMBODIMENTS OF THE INVENTION

Figure 1:
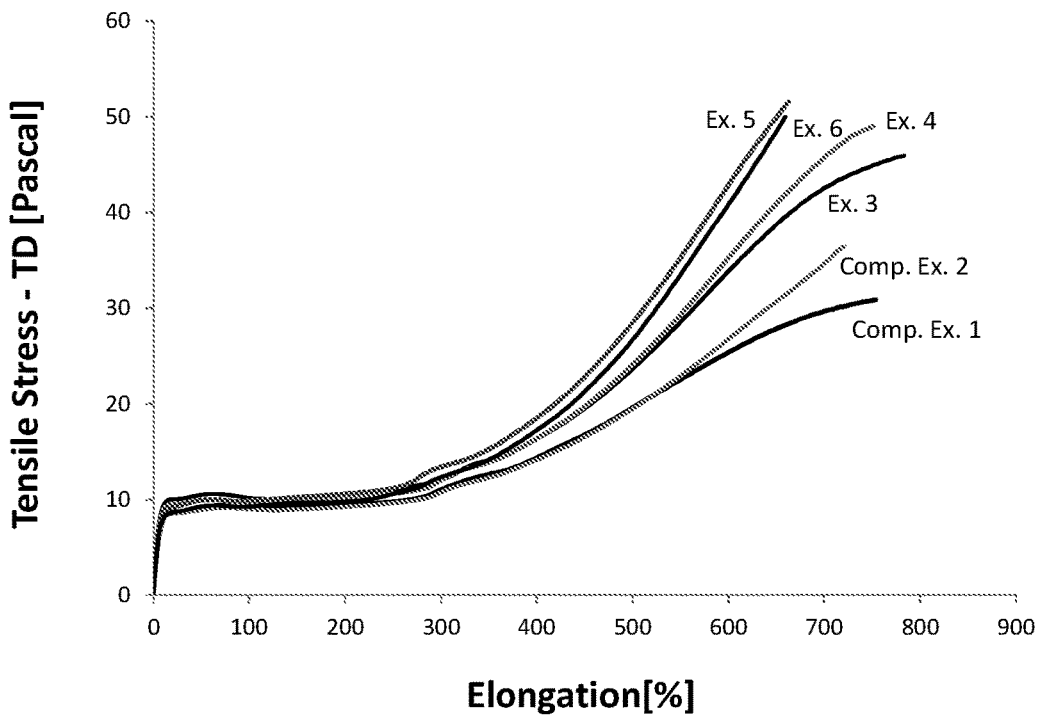
FIG. 1 illustrates the TD Tensile Stress performance of exemplary films described herein.

Embodiments of the invention provide multilayer film structures having improved performance, particularly in properties that are desirable for stretch hood applications. For example, embodiments of the invention provide multilayer films having improved stiffness and/or desirable hysteresis performance It is to be understood that the terminology used herein is for the purpose of describing particular embodiments only and is not intended to be limiting.

Definitions

In the following description, all numbers disclosed herein are approximate values, regardless whether the word "about" or "approximate" is used in connection therewith. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited. For example, whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1% to 100% with a 1% increment, i.e., k is 1%, 2%, 3%, 4%, 5%, . . . 50%, 51%, 52%, . . . 95%, 96%, 97%, 98%, 99%, or 100%. Moreover, any numerical range defined by two R numbers as defined in the above is also specifically disclosed.

Unless stated otherwise, all weight percentages of components in a film layer are based on the total weight of the total weight of the propylene-based polymer, PE1-, PE2-, and/or PE3-type polyethylenes in the film layer in question.

An "olefin", alternatively referred to as "alkene", is a linear, branched, or cyclic compound of carbon and hydrogen having at least one double bond. For purposes of this specification and the claims appended thereto, when a polymer or copolymer is referred to as comprising an olefin, including, but not limited to ethylene, hexene, and diene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene", "ethylene polymer", "ethylene copolymer", and "ethylene-based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a blend containing one or more polyethylene components.

PE1-Type Polyethylenes

PE1-type polyethylenes are ethylene-based polymers comprise ≥50.0 wt % of polymer units derived from ethylene and ≤50.0 wt % preferably 1.0 wt % to 35.0 wt %, even more preferably 1 to 6 wt % of polymer units derived from a $C_3$ to $C_{20}$ alpha-olefin comonomer (preferably hexene or octene).

PE1-type polyethylenes preferably have a composition distribution breadth index (CDBI) ≥60.0%, e.g., ≥about 65%, ≥about 70%, ≥about 72, ≥about 75, ≥about 77, ≥about 80.0%, or ≥about 90%. Additionally or alternatively, the CDBI may be ≤100%, e.g., ≤about 90%, ≤about 85%, ≤about 80%, ≤about 77%, ≤about 75%, ≤about 72%, ≤about 70%, or ≤about 65%. Ranges expressly disclosed include, but are not limited to, ranges formed by combinations any of the above-enumerated values, e.g., 60 to 100%, 60.0 to about 80.0%, or about 65 to about 80%.

Additionally or alternatively, PE1-type polyethylenes may have a density of ≥about 0.910 g/cm³, ≥about 0.915 g/cm³, ≥about 0.920 g/cm³, ≥about 0.925 g/cm³, ≥about 0.930 g/cm³, or ≥about 0.940 g/cm³. Additionally or alternatively, the first ethylene-based polymer may have a density of ≤about 0.950 g/cm³, e.g., ≤about 0.940 g/cm³, ≤about 0.930 g/cm³, ≤about 0.925 g/cm³, ≤about 0.920 g/cm³, or ≤about 0.915 g/cm³. Ranges expressly disclosed include ranges formed by combinations any of the above-enumerated values, e.g., 0.910 to 0.950 g/cm³, 0.910 to 0.930 g/cm³, 0.910 to 0.925 g/cm³, etc. Density is determined using chips cut from plaques compression molded in accordance with ASTM D-1928 Procedure C, aged in accordance with ASTM D-618 Procedure A, and measured as specified by ASTM D-1505.

In any aspect, PE1-type polyethylenes may have a melt index ($I_{2.16}$) according to ASTM D1238 (190° C./2.16 kg) of ≥about 0.5 g/10 min., e.g., ≥about 0.5 g/10 min., ≥about 0.7 g/10 min., ≥about 0.9 g/10 min., ≥about 1.1 g/10 min., ≥about 1.3 g/10 min., ≥about 1.5 g/10 min., or ≥about 1.8 g/10 min. Additionally or alternatively, the melt index (I2.16) may be ≤about 2.0 g/10 min., e.g., ≤about 1.8 g/10 min., ≤about 1.5 g/10 min., ≤about 1.3 g/10 min., ≤about 1.1 g/10 min., ≤about 0.9 g/10 min., or ≤about 0.7 g/10 min., 0.5 to 2.0 g/10 min., particularly 0.75 to 1.5 g/10 min. Ranges expressly disclosed include ranges formed by combinations any of the above-enumerated values, e.g., about 0.5 to about 2.0 g/10 min., about 0.7 to about 1.8 g/10 min., about 0.9 to about 1.5 g/10 min., about 0.9 to 1.3, about 0.9 to 1.1 g/10 min., about 1.0 g/10 min., etc.

In particular embodiments, the PE1-type polyethylenes may have a density of 0.910 to 0.920 g/cm³, a melt index ($I_{2.16}$) of 0.9 to 1.1 g/10 min., and a CDBI of 60.0% to 80.0%, preferably between 65% and 80%. PE1-type polyethylenes are generally considered linear, meaning they have a $g'_{vis} \geq 0.98$, as discussed herein below. Some such polyethylenes are available from ExxonMobil Chemical Company under the trade name Exceed™ metallocene (mPE) resins.

PE2-Type Polyethylenes

PE2-Type polyethylenes are ethylene-based polymers having about 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 1.0 to 12.5 wt %, 1.0 to 10.0 wt %, 1.0 to 7.5 wt %, 1.0 to 5.0 wt %, or 1.0 to 3.0 wt % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear or branched, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene being most preferred.

Typically, PE2-Type polyethylenes also have a Composition Distribution Breadth Index (CDBI) of at least 70%, e.g., ≥about 75%, ≥about 80%, ≥about 82, ≥about 85, ≥about 87, ≥about 90.0%, ≥about 95%, or ≥about 98%. Additionally or alternatively, the CDBI may be ≤100%, e.g., ≤about 98%, ≤about 95%, ≤about 90%, ≤about 87%, ≤about 85%, ≤about 82%, ≤about 80%, or ≤about 75%. Ranges expressly disclosed include, but are not limited to, ranges formed by combinations any of the above-enumerated values, e.g., 70 to about 98%, about 80 to about 95%, about 85 to about 90% etc.

Additionally or alternatively, PE2-Type polyethylenes may have a melt index, $I_{2.16}$, according to ASTM D1238 (190° C./2.16 kg), of ≥about 0.10 g/10 min., e.g., ≥about 0.15 g/10 min., ≥about 0.18 g/10 min., ≥about 0.20 g/10 min., ≥about 0.22 g/10 min., ≥about 0.25 g/10 min., or ≥about 0.28 g/10 min. Additionally or alternatively, second ethylene-based polymers may have a melt index ($I_{2.16}$)

≤about 0.30 g/10 min., e.g., ≤about 0.28 g/10 min., ≤about 0.25 g/10 min., ≤about 0.22 g/10 min., ≤about 0.20 g/10 min., ≤about 0.18 g/10 min., or ≤about 0.15 g/10 min. Ranges expressly disclosed include, but are not limited to, ranges formed by combinations any of the above-enumerated values, e.g., about 0.10 to about 0.30, about 0.15 to about 0.25, about 0.18 to about 0.22 g/10 min., etc.

Particular PE2-Type polyethylenes have a density ≥about 0.912 g/cm$^3$, e.g., ≥about 0.914 g/cm$^3$, ≥about 0.915 g/cm$^3$, ≥about 0.916 g/cm$^3$, ≥about 0.917 g/cm$^3$, ≥about 0.918 g/cm$^3$. Additionally or alternatively, PE2-Type polyethylenes may have a density ≤about 0.920 g/cm$^3$, e.g., ≤about 0.918 g/cm$^3$, ≤about 0.917 g/cm$^3$, ≤about 0.916 g/cm$^3$, ≤about 0.915 g/cm$^3$, or ≤about 0.914 g/cm$^3$. Ranges expressly disclosed include, but are not limited to, ranges formed by combinations any of the above-enumerated values, e.g., about 0.912 to about 0.920 g/cm$^3$, 0.915 to 0.925 g/cm$^3$, 0.914 to 0.918 g/cm$^3$, 0.915 to 0.917 g/cm$^3$, etc. Density is determined using chips cut from plaques compression molded in accordance with ASTM D-1928 Procedure C, aged in accordance with ASTM D-618 Procedure A, and measured as specified by ASTM D-1505.

Typically, although not necessarily, PE2-Type polyethylenes have a molecular weight distribution (MWD, defined as $M_w/M_n$) of about 2.5 to about 5.5, preferably 4.0 to 5.0.

PE2-Type polyethylenes may also be characterized by an averaged 1% secant modulus (M) of from 10,000 to 60,000 psi (pounds per square inch), and a relation between M and the dart drop impact strength in g/mil (DIS) complying with formula (A):

$$DIS \geq 0.8*[100+e^{(11.71-0.000268M+2.183\times10^{-9}M^2)}], \quad (A)$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil.

The relationship of the Dart Impact Strength to the averaged 1% secant modulus is thought to be one indicator of long-chain branching in the ethylene-based polymer. Thus, alternatively ethylene-based polymers of certain embodiments may be characterized as having long-chain branches. Long-chain branches for the purposes of this invention represent the branches formed by reincorporation of vinyl-terminated macromers, not the branches formed by incorporation of the comonomers. The number of carbon atoms on the long-chain branches ranges from a chain length of at least one carbon more than two carbons less than the total number of carbons in the comonomer to several thousands. For example, a long-chain branch of an ethylene/hexene ethylene-based polymer is at least five (5) carbons in length (i.e., 6 carbons less 2 equals 4 carbons plus one equals a minimum branch length of five carbons for long-chain branches). Particular ethylene-based polymers have a 0.05 to 1.0, particularly 0.05 to 0.5, 0.1 to 0.4, or 0.2 to 0.3, long-chain branches per 1000 carbon atoms. Ethylene-based polymers having levels of long-chain branching greater than 1.0 long-chain branch per 1000 carbon atoms may have some beneficial properties, e.g., improved processability, shear thinning, and/or delayed melt fracture, and/or improved melt strength.

Various methods are known for determining the presence of long-chain branches. For example, long-chain branching can be determined using $^{13}$C nuclear magnetic resonance (NMR) spectroscopy and to a limited extent; e.g., for ethylene homopolymers and for certain copolymers, and it can be quantified using the method of Randall (*Journal of Macromolecular Science, Rev. Macromol. Chem. Phys.*, C29 (2&3), p. 285-297). Although conventional $^{13}$C NMR spectroscopy cannot determine the length of a long-chain branch in excess of about six carbon atoms, there are other known techniques useful for quantifying or determining the presence of long-chain branches in ethylene-based polymers, such as ethylene/1-octene interpolymers. For those ethylene-based polymers wherein the $^{13}$C resonances of the comonomer overlap completely with the $^{13}$C resonances of the long-chain branches, either the comonomer or the other monomers (such as ethylene) can be isotopically labeled so that the long-chain branches can be distinguished from the comonomer. For example, a copolymer of ethylene and 1-octene can be prepared using $^{13}$C-labeled ethylene. In this case, the resonances associated with macromer incorporation will be significantly enhanced in intensity and will show coupling to neighboring $^{13}$C carbons, whereas the octene resonances will be unenhanced.

Alternatively, the degree of long-chain branching in ethylene-based polymers may be quantified by determination of the branching index. The branching index g' is defined by the following equation:

$$g' = \frac{IV_{BR}}{IV_{Lin}}\bigg|_{M_W}$$

where g' is the branching index, $IV_{Br}$ is the intrinsic viscosity of the branched ethylene-based polymer and $IV_{Lin}$ is the intrinsic viscosity of the corresponding linear ethylene-based polymer having the same weight average molecular weight and molecular weight distribution as the branched ethylene-based polymer, and in the case of copolymers and terpolymers, substantially the same relative molecular proportion or proportions of monomer units. For the purposes, the molecular weight and molecular weight distribution are considered "the same" if the respective values for the branched polymer and the corresponding linear polymer are within 10% of each other. Preferably, the molecular weights are the same and the MWD of the polymers are within 10% of each other. A method for determining intrinsic viscosity of polyethylene is described in *Macromolecules*, 2000, 33, 7489-7499. Intrinsic viscosity may be determined by dissolving the linear and branched polymers in an appropriate solvent, e.g., trichlorobenzene, typically measured at 135° C. Another method for measuring the intrinsic viscosity of a polymer is ASTM D-5225-98-Standard Test Method for Measuring Solution Viscosity of Polymers with a Differential Viscometer, which is incorporated by reference herein in its entirety.

The branching index, g' is inversely proportional to the amount of branching. Thus, lower values for g' indicate relatively higher amounts of branching. The amounts of short and long-chain branching each contribute to the branching index according to the formula: $g'=g'_{LCB} \times g'_{SCB}$. Thus, the branching index due to long-chain branching may be calculated from the experimentally determined value for g' as described by Scholte, et al., in *J. App. Polymer Sci.*, 29, pp. 3763-3782 (1984), incorporated herein by reference.

Typically, PE2-Type polyethylenes have a $g'_{vis}$ of 0.85 to 0.98, particularly, 0.87 to 0.97, 0.89 to 0.97, 0.91 to 0.97, or 0.93 to 0.95.

PE2-Type polyethylenes may be made by any suitable polymerization method (including solution or slurry polymerization methods) may be used, second ethylene-based polymers of the present invention may be readily obtained via a continuous gas phase polymerization using supported catalyst comprising an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexyl-aluminum (TNHAL), and the like).

Zirconium transition metal metallocene-type catalyst systems are particularly suitable. Non-limiting examples of metallocene catalysts and catalyst systems useful in practicing the present invention include those described in, U.S. Pat. Nos. 5,466,649, 6,476,171, 6,225,426, and 7,951,873; and in the references cited therein, all of which are fully incorporated herein by reference. Particularly useful catalyst systems include supported dimethylsilyl bis(tetrahydroindenyl) zirconium dichloride.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydol™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See e.g., U.S. Pat. Nos. 4,543,399; 4,588,790; 5,028,670; 5,317,036; 5,352,749; 5,405,922; 5,436,304; 5,453,471; 5,462,999; 5,616,661; and 5,668,228 all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100 psig (680 kPag)-500 psig (3448 kPag), or in the range of from 200 psig (1379 kPag)-400 psig (2759 kPag), or in the range of from 250 psig (1724 kPag)-350 psig (2414 kPag). The reactor operated at a temperature in the range of 60° C. to 120° C., 60° C. to 115° C., 70° C. to 110° C., 70° C. to 95° C., or 85° C. to 95° C. The productivity of the catalyst or catalyst system is influenced by the main monomer partial pressure. The mole percent of the main monomer, ethylene, is from 25.0-90.0 mole percent, or 50.0-90.0 mole percent, or 70.0-85.0 mole percent, and the monomer partial pressure is in the range of from 75 psia (517 kPa)-300 psia (2069 kPa), or 100-275 psia (689-1894 kPa), or 150-265 psia (1034-1826 kPa), or 200-250 psia (1378-1722 kPa), which are typical conditions in a gas phase polymerization process.

Other gas phase processes contemplated by the process of the invention include those described in U.S. Pat. Nos. 5,627,242, 5,665,818 and 5,677,375, and European published patent applications EP-A-0 794 200, EP-A-0 802 202, and EP-B-0 634 421 all of which are herein fully incorporated by reference.

It may be beneficial in slurry or gas phase processes, to operate in the substantial absence of, or essentially free of, any scavengers, such as triethylaluminum, trimethylaluminum, triisobutylaluminum, and tri-n-hexylaluminum and diethyl aluminum chloride and the like. Such processes are described in PCT Publication No. WO 96/08520, which is herein fully incorporated by reference.

Additionally, the use of a process continuity aid, while not required, may be desirable in any of the foregoing processes. Such continuity aids are well known to persons of skill in the art and include, for example, metal stearates.

Particular PE2-type polyethylenes are available from ExxonMobil Chemical Company as Enable™ metallocene polyethylene (mPE) resins.

PE3-Type Polyethylenes

Films described herein may optionally include a PE3-type polyethylene in one or more layers. PE3-type polyethylene is an ethylene-based having polyethylene having a $g'_{vis}$ as described above of 0.50 to 0.85, particularly 0.50 to 0.80, 0.50 to 0.75, 0.50 to 0.70, 0.50 to 0.65, 0.50 to 0.60, or 0.50 to 0.55.

Preferably, the PE3-type polyethylene is a copolymer of ethylene, and one or more polar comonomers. Typically, PE3-type polyethylenes useful herein include 99.0 to about 80.0 wt %, 99.0 to 85.0 wt %, 99.0 to 87.5 wt %, 95.0 to 90.0 wt %, of polymer units derived from ethylene and about 1.0 to about 20.0 wt %, 1.0 to 15.0 wt %, 1.0 to 12.5 wt %, or 5.0 to 10.0 wt % of polymer units derived from one or more polar comonomers. Suitable polar comonomers include, but are not limited to: vinyl ethers such as vinyl methyl ether, vinyl n-butyl ether, vinyl phenyl ether, vinyl beta-hydroxyethyl ether, and vinyl dimethylamino-ethyl ether; olefins such as propylene, butene-1, cis-butene-2, trans-butene-2, isobutylene, 3,3,-dimethylbutene-1, 4-methylpentene-1, octene-1, and styrene; vinyl type esters such as vinyl acetate, vinyl butyrate, vinyl pivalate, and vinylene carbonate; haloolefins such as vinyl fluoride, vinylidene fluoride, tetrafluoroethylene, vinyl chloride, vinylidene chloride, tetrachloroethylene, and chlorotrifluoroethylene; acrylic-type esters such as methyl acrylate, ethyl acrylate, n-butyl acrylate, t-butyl acrylate, 2-ethylhexyl acrylate, alpha-cyanoisopropyl acrylate, beta-cyanoethyl acrylate, o-(3-phenylpropan-1,3,-dionyl)phenyl acrylate, methyl methacrylate, n-butyl methacrylate, t-butyl methacrylate, cyclohexyl methacrylate, 2-ethylhexyl methacrylate, methyl methacrylate, glycidyl methacrylate, beta-hydroxethyl methacrylate, beta-hydroxpropyl methacrylate, 3-hydroxy-4-carbomethoxy-phenyl methacrylate, N,N-dimethylaminoethyl methacrylate, t-butylaminoethyl methacrylate, 2-(1-aziridinyl)ethyl methacrylate, diethyl fumarate, diethyl maleate, and methyl crotonate; other acrylic-type derivatives such as acrylic acid, methacrylic acid, crotonic acid, maleic acid, methyl hydroxy maleate, itaconic acid, acrylonitrile, fumaronitrile, N,N-dimethylacrylamide, N-isopropylacrylamide, N-t-butylacrylamide, N-phenylacrylamide, diacetone acrylamide, methacrylamide, N-phenylmethacrylamide, N-ethylmaleimide, and maleic anhydride; and other compounds such as allyl alcohol, vinyltrimethylsilane, vinyltriethoxysilane, N-vinylcarbazole, N-vinyl-N-methylacetamide, vinyldibutylphosphine oxide, vinyldiphenylphosphine oxide, bis-(2-chloroethyl) vinylphosphonate, and vinyl methyl sulfide.

Preferably, PE3-type polyethylenes are an ethylene/vinyl acetate copolymer having about 2.0 wt % to about 15.0 wt %, typically about 5.0 wt % to about 10.0 wt %, polymer units derived from vinyl acetate, based on the amounts of polymer units derived from ethylene and vinyl acetate. In certain embodiments, the EVA resin can further include polymer units derived from one or more comonomer units selected from propylene, butene, 1-hexene, 1-octene, and/or one or more dienes. Suitable dienes include, for example, 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), and combinations thereof.

Third ethylene based polymers may have a melt index ($I_{2.16}$) as measured according to ASTM D1238, 2.16 kg, 190° C., of 0.05 to 12.0 g/10 min., particularly 0.1 to 2.5 g/10 min., 0.2 to 1.0, or 0.3 to 0.7 g/10 min.

In some embodiments, the PE3-type polyethylenes may have a melting point of 40° C. or less, as measured by industry acceptable thermal methods, such as Differential Scanning Calorimetry (DSC). In other embodiments, the melting point can may be 40.0° C. to about 90.0° C.; 40.0° C. to 80.0° C.; 50.0° C. to 70.0° C.; 55.0° C. to 65.0° C.; or about 60.0° C.

PE3-type polyethylenes may have a Vicat softening point of about 20.0° C. to about 80.0° C., as measured by ASTM D1525. The Vicat softening point can also range from a low of about 20° C., 25.0° C., or 30.0° C. to a high of about 35.0° C., 40.0° C., or 50.0° C. The Vicat softening point of the HPPE resin can also be 20.0° C. to 70.0° C.; 30.0° C. to 60.0° C.; 35.0° C. to 45.0° C.; about 35.0° C., or 40.0° C.

In some embodiments, the PE3-type polyethylenes include 0.1 wt % to 10.0 wt % units derived from one or more modifiers, based on the total weight of the resin. The amount of the modifier(s) can range from a low of about 0.1 wt %, 0.3 wt %, or 0.8 wt % to a high of about 3.0 wt %, 6.0 wt %, or 10.0 wt %, based on the total weight of the resin. The amount of the modifier(s) can also range from a low of about 0.2 wt %, 0.4 wt %, or 0.8 wt % to a high of about 1.5 wt %, 2.5 wt %, 3.6 wt %, or 5 wt %, based on the total weight of the resin. The amount of the modifier can also be 0.1 wt % to 8 wt %; 0.2 wt % to 6 wt %; 0.3 wt % to 6 wt %; 0.3 wt % to 4 wt %; 0.4 wt % to 4.0 wt %; 0.6 wt % to 4 wt %; 0.4 wt % to 3.5 wt %; or 0.5 wt % to 3.8 wt %, based on the total weight of the resin.

Suitable modifiers, also called chain transfer agents, can include, but are not limited to, tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-butene-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, 1-butene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, proprionaldehyde, and phosphine. Further details and other suitable transfer agents are described in *Advances in Polymer Science*, Vol. 7, pp. 386-448 (1970).

The $C_2$ to $C_{12}$ unsaturated modifiers contain at least one unsaturation, but they can also contain multiple conjugated or non-conjugated unsaturations. In case of multiple unsaturations, it is preferred that they are non-conjugated. In certain embodiments, the unsaturation of the $C_2$ to $C_{12}$ unsaturated modifier can be di-substituted with one or more alkyl groups in the beta position. Preferred $C_2$ to $C_{12}$ unsaturated modifiers include propylene, isobutylene, or a combination thereof.

A PE3-type polyethylene can also contain one or more antioxidants. Phenolic antioxidants are preferred, such as butylated hydroxytoluene (BHT) or other derivatives containing butylated hydroxytoluene units such as Irganox™ 1076 or Irganox™ 1010 and alike. The antioxidant can be present in an amount less than 0.05 wt %, based on the total weight of the resin. When present, for example, the amount of the one or more antioxidants can range from a low of about 0.001 wt %, 0.005 wt %, 0.01 wt %, or 0.015 wt % to a high of about 0.02 wt %, 0.03 wt %, 0.04 wt %, or 0.05 wt %.

PE3-type polyethylenes can further contain one or more additives. Suitable additives can include, but are not limited to: stabilization agents such as antioxidants or other heat or light stabilizers; anti-static agents; crosslink agents or co-agents; crosslink promoters; release agents; adhesion promoters; plasticizers; or any other additive and derivatives known in the art. Suitable additives can further include one or more anti-agglomeration agents, such as oleamide, stearamide, erucamide or other derivatives with the same activity as known to the person skilled in the art. Preferably, the HPPE resin contains less than 0.15 wt % of such additives, based on the total weight of the resin. When present, the amount of the additives can also range from a low of about 0.01 wt %, 0.02 wt %, 0.03 wt %, or 0.05 wt % to a high of about 0.06 wt %, 0.08 wt %, 0.11 wt %, or 0.15 wt %.

PE3-type polyethylenes are available from ExxonMobil Chemical Company as ExxonMobil™ LDPE or Nexxstar™ resins.

Propylene-Based Elastomer

As used herein term "propylene-based elastomer" means a polymer having a melt flow rate in the range of 0.5 to 2.5 g/10 min., a heat of fusion of ≤75 J/g and comprising 65 to 95 wt % of polymer units derived from propylene and 3 to 35 wt % of polymer units derived from ethylene, a $C_4$ to $C_{20}$ alpha-olefin comonomer, or mixtures thereof, based upon total weight of the propylene-based elastomer.

The alpha-olefin comonomer may be linear or branched, and two or more comonomers may be used, if desired. Examples of suitable alpha-olefin comonomers include butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents;

1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene.

In some embodiments the propylene-based elastomers may further comprise one or more diene-derived units. The propylene-based elastomers may have a comonomer content (i.e., ethylene and/or $C_4$ to $C_{10}$ alpha-olefin content) in the range of from 3 to 35 wt %, based on the weight of the propylene-based elastomer. In some embodiments, the propylene-based elastomer has an isotactic triad fraction in the range of about 65% to about 99%.

The propylene-based elastomer may incorporate propylene-derived units having crystalline regions interrupted by non-crystalline regions. The non-crystalline regions may result from regions of non-crystallizable polypropylene segments and/or the inclusion of comonomer units. The crystallinity and the melting point of the propylene-based elastomer may be reduced as compared to highly isotactic polypropylene by the introduction of errors in the insertion of propylene and/or by the presence of comonomer.

In some embodiments, the crystallinity of the propylene-based elastomer is reduced by the copolymerization of propylene with limited amounts of one or more comonomers selected from: ethylene, $C_4$ to $C_{20}$ alpha-olefins, and optionally dienes. Preferred comonomers are ethylene, 1-butene, 1-hexane, and/or 1-octene. The propylene-based elastomer may comprise comonomer-derived units in an amount in the range of 5 to 35 wt %, or in the range of 5 to 28 wt %, or in the range of 5 to 25 wt %, or in the range of 5 to 20 wt %, or in the range of 5 to 16 wt %, or in the range of 6 to 18 wt %, or in some embodiments in the range of 7 to 20 wt % comonomer-derived units, based on the weight of the propylene-based elastomer. The comonomer content of the propylene-based elastomer may be determined by ASTM D3900.

In one embodiment, the propylene-based elastomer comprises at least 65 wt %, or at least 75 wt %, or at least 89 wt %, of propylene-derived units, based on the weight of the propylene-based elastomer. In another embodiment, the propylene-based elastomer comprises from 65 wt % to 95 wt %, or from 75 wt % to 95 wt %, or from 89 wt % to 93 wt %, or from 80 wt % to 90 wt %, of propylene-derived units, based on the weight of the propylene-based elastomer.

In some embodiments, when more than one comonomer is present, the amount of a particular comonomer may be <5 wt %, but the combined comonomer content is preferably >5 wt %. When there is more than one comonomer unit in the copolymer, the total weight percent of the ethylene and/or $C_4$ to $C_{10}$ alpha-olefin derived units may be in the range of 5 to 35 wt %, or in the range of 7 to 32 wt %, or in the range of 8 to 25 wt %, or preferably in the range of 8 to 20 wt %, or more preferably in the range of 8 to 18 wt %. Particular embodiments of copolymers having more than one comonomer units include propylene-ethylene-octene, propylene-ethylene-hexene, and propylene-ethylene-butene polymers. These copolymers may further comprise a diene.

In some embodiments, the propylene-based elastomer consists essentially of units derived from propylene and ethylene. The propylene-based elastomer may comprise 5 to 35 wt % of ethylene-derived units, or 5 to 30 wt %, or 5 to 25 wt %, or 5 to 20 wt % of ethylene-derived units, based on the total weight of the propylene-based elastomer. In one embodiment, the propylene-based elastomer comprises 10 to 12 wt % of ethylene-derived units, based on the total weight of the propylene-based elastomer. In another embodiment, the propylene-based elastomer comprises 15 to 20 wt % of ethylene-derived units, based on the total weight of the propylene-based elastomer. In other embodiments, the propylene-based elastomer may comprise 5 to 16 wt % of ethylene-derived units.

The propylene-based elastomer may optionally comprise less than or equal to 12 wt % diene-derived units (or "diene"), or less than or equal to 10 wt % diene, or less than or equal to 5 wt % diene, or preferably less than or equal to 3 wt % diene. In some embodiments the diene is present in the range of 0.1 to 9 wt %, or in the range of 0.1 to 6 wt %, or in the range of 0.1 to 5 wt %, or in the range of 0.1 to 4 wt %, or in the range of 0.1 to 2 wt %, or in the range of 0.1 to 1 wt %. In other embodiments, the propylene-based elastomer may comprise the diene in amount in the range of from about 2.0 wt % to about 7.0 wt %, or in the range of about 3.0 wt % to about 5.0 wt %, based on the total weight of the propylene-based elastomer. The optional diene units may be derived from any hydrocarbon structure having at least two unsaturated bonds wherein at least one of the unsaturated bonds may be incorporated into a polymer. Suitable dienes include, but are not limited to: straight chain acyclic olefins such as 1,4-hexadiene and 1,6-octadiene; branched chain acyclic olefins such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins such as tetrahydroindene, methyl-tetrahydroindene, dicyclopentadiene ("DCPD"), ethylidiene norbornene ("ENB"), norbornadiene, alkenyl norbornenes, alkylidene norbornenes, cycloalkelnyl norobornenes, and cycloalkylinene norbornenes (such as 5-vinyl-2-norbornene); cycloalkenyl-substituted alkenes, such as vinyl cyclohexene, allyl cyclohexene, vinyl cyclooctene, 4-vinyl cyclohexene, alkyl cyclodecene, vinyl cyclododecene, divinyl benzene, and tetracyclo (A-11,12)-5,8-dodecene; and combinations thereof. In certain embodiments, the diene is 5-ethylidene-2-norbornene, 5-vinyl-2-norbornene, or divinyl benzene. The diene, if present, is preferably ENB.

The propylene-based elastomer may have a melt flow rate ("MFR", ASTM D1238, 2.16 kg, 230° C.) ≥about 1.0 g/10 min., e.g., ≥about 1.3 g/10 min., ≥about 1.5 g/10 min., ≥about 1.7 g/10 min., ≥about 2.0 g/10 min., ≥about 2.3 g/10 min., ≥about 2.7 g/10 min., or ≥about 2.9 g/10 min. Additionally or alternatively, the propylene-based elastomer may have a MFR of ≤about 5.0 g/10 min., e.g., ≤about 5.0 g/10 min., ≤about 4.7 g/10 min., ≤about 4.0 g/10 min., ≤about 3.7 g/10 min., ≤about 3.5 g/10 min., ≤about 3.3 g/10 min., or ≤about 3.1 g/10 min. Ranges expressly disclosed include, but are not limited to, ranges formed by combinations of any of the above-enumerated values, e.g., about 1.0 to about 5.0 g/10 min., about 1.3 to about 4.7 g/10 min., about 1.5 to about 4.0 g/10 min., about 2.0 to about 3.7 g/10 min., about 2.3 to about 3.5 g/10 min., about 2.7 to about 3.3 g/10 min., about 2.9 to about 3.1 g/10 min., etc.

Additionally or alternatively, the propylene-based elastomer may be characterized by a melt index ($I_{2.16}$), determined according to ASTM D1238, 2.16 kg/190° C., ≥about 0.5 g/10 min., e.g., ≥about 0.75 g/10 min., ≥about 0.80 g/10 min., ≥about 0.85 g/10 min., ≥about 0.90 g/10 min., or ≥about 1.0 g/10 min. Some propylene-based elastomers have a melt index ($I_{2.16}$) ≤about 2.5 g/10 min., ≤about 2.25 g/10 min., ≤about 1.5 g/10 min., ≤about 1.3 g/10 min., ≤about 1.2 g/10 min., ≤about 1.0 g/10 min. Ranges expressly disclosed include, but are not limited to, ranges formed by combinations of any of the above-enumerated values, e.g., about 0.5 to about 2.5 g/10 min., about 0.75 to about 2.25 g/10 min., about 0.75 to about 1.5 g/10 min., about 0.90 to about 1.3 g/10 min., about 1.0 to about 1.2 g/10 min., etc.

In one embodiment, the propylene-based elastomer has a heat of fusion ("Hf"), as determined by the Differential Scanning Calorimetry ("DSC") procedure described herein, of greater than or equal to 0.5 J/g, or 1 J/g, or 5 J/g, and is less than or equal to 75 J/g, or preferably less than or equal to 70 J/g, or 50 J/g, or less than or equal to 35 J/g. Stated another way, in one or more embodiments, the Hf value may be within the range of 1.0, or 1.5, or 3.0, or 4.0, or 6.0, or 7.0 J/g to 30, or 35, or 40, or 50, or 60, or 70, or 75 J/g.

The propylene-based elastomer may have a percent crystallinity within the range of 0.5 to 40%, or in the range of 1 to 30%, or preferably in the range of 5 to 35%, wherein "percent crystallinity" is determined according to the DSC procedure described herein. The thermal energy for the highest order of propylene is estimated at 189 J/g (i.e., 100% crystallinity is equal to 189 J/g). In some embodiments, the propylene-based elastomer has a crystallinity less than 40%, or in the range of 0.25 to 25%, or in the range of 0.5 to 22%.

The procedure for DSC determinations is as follows. About 0.5 grams of polymer is weighed and pressed to a thickness of about 15 to 20 mils (about 381-508 μm) at about 140-150° C., using a "DSC mold" and MYLAR™ film as a backing sheet. The pressed polymer sample is allowed to cool to ambient temperatures by hanging in air (the MYLAR™ film backing sheet is not removed). The pressed polymer sample is then annealed at room temperature (about 23-25° C.). A 15-20 mg disc is removed from the pressed polymer sample using a punch die and is placed in a 10 microliter aluminum sample pan. The disc sample is then placed in a DSC (Perkin Elmer Pyris 1 Thermal Analysis System) and is cooled to about −100° C. The sample is heated at about 10° C./min to attain a final temperature of about 165° C. The thermal output, recorded as the area under the melting peak of the disc sample, is a measure of the heat of fusion and can be expressed in Joules per gram (J/g) of polymer and is automatically calculated by the Perkin Elmer system. Under these conditions, the melting profile shows two (2) maxims, the maxima at the highest temperature is taken as the melting point within the range of melting of the disc sample relative to a baseline measurement for the increasing heat capacity of the polymer as a function of temperature.

The propylene-based elastomer may have a single peak melting transition as determined by DSC. In one embodiment, the propylene-based elastomer has a primary peak transition of less than about 90° C., with a broad end-of-melt transition of greater than about 110° C. The peak "melting point" ("Tm") is defined as the temperature of the greatest heat absorption within the range of melting of the sample. However, the copolymer may show secondary melting peaks adjacent to the principal peak, and/or at the end-of-melt transition, however for the purposes herein, such secondary melting peaks are considered together as a single melting point, with the highest of these peaks being considered the Tm of the propylene-based elastomer. The propylene-based elastomer may have a Tm of less than or equal to 115° C., or less than or equal to 100° C., or less than or equal to 90° C., or less than or equal to 80° C., or less than or equal to 70° C., or in one embodiment in the range of 25 to 100° C., or in the range of 25 to 85° C., or in the range of 25 to 75° C., or in the range of 25 to 65° C., or in the range of 30 to 80° C., or in the range of 30 to 70° C.

The propylene-based elastomer may have a weight average molecular weight ("Mw") in the range of 5,000 to 5,000,000 g/mole, or preferably in the range of 10,000 to 1,000,000 g/mole, or more preferably in the range of 50,000 to 400,000 g/mole. In some embodiments the propylene-based elastomer has a Mw greater than 10,000, or greater than 15,000, or greater than 20,000, or greater than 80,000 g/mole and less than 5,000,000, or less than 1,000,000, or less than 500,000 g/mole.

The propylene-based elastomer may have a number average molecular weight ("Mn") in the range of 2,500 to 2,500,00 g/mole, or preferably in the range of 10,000 to 250,000 g/mole, or more preferably in the range of 25,000 to 200,000 g/mole. The propylene-based elastomer may have a Mz within the range of 10,000 to 7,000,000 g/mole, or preferably in the range of 80,000 to 700,000 g/mole, or more preferably in the range of 100,000 to 500,000 g/mole.

The propylene-based elastomer may have a molecular weight distribution ("MWD") (Mw/Mn) within the range of 1.5 to 20, or in the range of 1.5 to 15, or in the range of 1.5 to 5, or preferably in the range of 1.8 to 5, or more preferably in the range of 1.8 to 3 or 4. In some embodiments the propylene-based elastomer's MWD is in the range of 1.5 or 1.8 or 2.0 to 4.5 or 5 or 10 or 20 or 40.

Techniques for determining the molecular weight (Mn, Mw, and Mz) and MWD of propylene-based elastomers are as follows, and as in Verstate et al, in 21 Macromolecules 3360 (1988). Conditions described herein govern over published test conditions. Molecular weight and MWD are measured using a Waters 150 gel permeation chromatograph equipped with a Chromatix KMX-6 on-line light scattering photometer. The system is used at 135° C. with 1,2,4-trichlorobenze as the mobile phase. Showdex (Showa-Denko America, Inc.) polystyrene gel columns 802, 803, 804, and 805 are used. This technique is discussed in Liquid Chromatography of Polymers and Related Materials III 207 (J. Cazes ed., Marcel Dekker, 1981). No corrections for column spreading are employed; however, data on generally acceptable standards, e.g. National Bureau of Standards Polyethylene 1484 and anionically produced hydrogenated polyisoprenes (an alternating ethylene propylene copolymer) demonstrate that such corrections on Mw/Mn or Mz/Mw are less than 0.05 units. Mw/Mn is calculated from an elution time-molecular relationship whereas Mz/Mw is evaluated using the light scattering photometer. The numerical analysis can be performed using the commercially available computer software GPC2, MOLWT2 available from LDC/Milton Roy-Rivera Beach, Fla.

Preferred propylene-based elastomers may have a propylene tacticity index (m/r) ranging from a lower limit of 4 or 6 to an upper limit of about 8, 10, or 12. The propylene tacticity index, expressed herein as "m/r", is determined by $^{13}C$ nuclear magnetic resonance (NMR). The propylene tacticity index m/r is calculated as defined in H. N. Cheng, *Macromolecules,* 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, an m/r ratio of 1.0 an atactic material and an m/r ratio of greater than 1.0 an isotactic material. Isotactic materials theoretically have a ratio approaching infinity, and many by-product atactic polymers have sufficient isotactic content to result in ratios of greater than 50.

The propylene-based elastomer may have an isotactic triad tacticity of three propylene units, as measured by $^{13}C$ NMR, of 75% or more, or 80% or more, or 82% or more, or 85% or more, or in some embodiments 90% or more. Preferably, the triad tacticity is in the range of 50 to 99%, or in the range of 60 to 99%, or more preferably in the range of 75 to 99%, or in the range of 80 to 99%, or in the range of 70 to 98%, or in other embodiments in the range of 60 to 97%. As used herein, isotactic triad tacticity is defined to be an mm triad tacticity of three propylene units, as measured by $^{13}$C NMR. The triad tacticity can be determined from a $^{13}$C NMR spectrum of the polymer as described below and as described in U.S. Pat. No. 5,504,172, herein incorporated by reference. The mm triad tacticity of a polymer is the relative tacticity of a sequence of three adjacent propylene units, a chain consisting of head to tail bonds, expressed as a binary combination of m and r sequences. It is usually expressed for the propylene-based elastomers as the ratio of the number of units of the specified tacticity to all of the propylene triads in the copolymer. The mm triad tacticity (mm fraction) of a propylene copolymer can be determined from a $^{13}$C NMR spectrum of the propylene copolymer and the following formula:

$$mmFraction = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

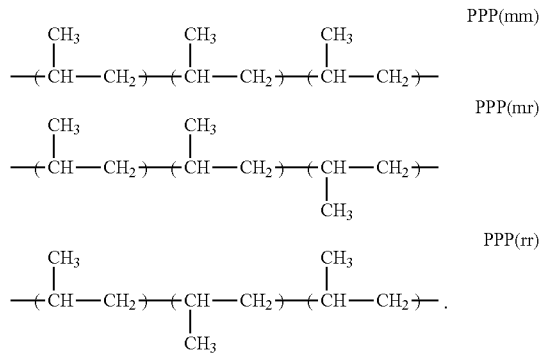

The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum is assigned with reference to an article in the journal *Polymer*, Volume 30 (1989), p. 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The propylene-based elastomer may have a density within the range of ≥about 0.850 g/cm$^3$, e.g., ≥about 0.860 g/cm$^3$, ≥about 0.865 g/cm$^3$, or ≥about 0.872 g/cm$^3$. Additionally or alternatively, the propylene-based elastomer may have a density ≤about 0.920 g/cm$^3$, e.g., ≤about 0.900 g/cm$^3$, ≤about 0.880 g/cm$^3$, ≤about 0.878 g/cm$^3$, ≤about 0.872 g/cm$^3$, ≤about 0.865 g/cm$^3$, ≤about 0.860 g/cm$^3$. Ranges expressly disclosed include, but are not limited to, ranges formed by combinations any of the above-enumerated values, e.g., about 0.850 to about 0.920 g/cm$^3$, about 0.860 to about 0.900 g/cm$^3$, about 0.865 to about 0.880 g/cm$^3$, about 0.872 to about 0.878 g/cm$^3$, etc. The density is determined at room temperature as measured per the ASTM D-1505 test method.

The propylene-based elastomer may possess an Elongation at Break (ASTM D-412 at 23° C.) of less than 2000%, or less than 1000%, or less than 900%.

In one embodiment, the propylene-based elastomer has a Shore A hardness (ASTM D-2240 at 23° C.) of less than about 90. In another embodiment, the propylene-based elastomer has a Shore A hardness of in the range of about 45 to about 90, or in the range of about 55 to about 80.

The propylene-based elastomers described herein are not limited by any particular polymerization method for preparing the propylene-based elastomer. The propylene-based elastomers can include copolymers prepared according to the procedures in International Patent WO 00/01745, WO 02/36651,and U.S. Pat. Nos. 6,992,158, 6,881,800, and 7,232,871, all of which are herein incorporated by reference. Examples of commercially available propylene-based elastomers include resins sold under the trade names VISTAMAXX™ (ExxonMobil Chemical Company, Houston, Tex., USA) and VERSIFY™ (The Dow Chemical Company, Midland, Mich., USA).

In one embodiment the propylene-based elastomer comprises 80 to 90 wt % propylene-derived units and 10 to 20 wt % of ethylene-derived units. The propylene-based elastomer has a density in the range of 0.855 to 0.870 g/cm$^3$ and an MFR in the range of 2 to 4 dg/min. The propylene-based elastomer may have a Shore A hardness in the range of 60 to 70. The propylene-based elastomer may have a percent crystallinity in the range of 3 to 10%.

In another embodiment the propylene-based elastomer comprises 85 to 95 wt % propylene-derived units and 5 to 15 wt % ethylene-derived units. The propylene-based elastomer has a density in the range of 0.865 to 0.880 g/cm$^3$ and an MFR in the range of 2 to 4 dg/min. The propylene-based elastomer may have a Shore A hardness in the range of 80 to 95. The propylene-based elastomer may have a percent crystallinity in the range of 5 to 15%.

First and Second Outer Layer Composition

The films described herein include polyethylene-containing first and second outer layers, independently preferably comprising: 1) from 80.0 to 100.0 wt % of a at least a first PE1 polymer according to any embodiment described above. The amount of the PE1-type polymer in the first and/or second outer layer independently may be e.g., ≥about 82.5 wt %, ≥about 85.0 wt %, ≥about 87.5 wt %, ≥about 90.0 wt %, ≥about 92.5 wt %, ≥about 95.0 wt %, ≥about 97.5 wt %, or ≥about 99.0 wt %. Additionally or alternatively, the amount of the first PE1 in the first outer layer may be ≤about 100 wt %, e.g., ≤about 99.0 wt %, ≤about 97.5 wt %, ≤about 95.0 wt %, ≤about 92.5 wt %, ≤about 90.0 wt %, ≤about 87.5 wt %, ≤about 85.0 wt %, or ≤about 82.5 wt %. Ranges expressly disclosed include, but are not limited to, ranges formed by combinations any of the above-enumerated values, e.g., about 82.5 to about 99.0 wt %, about 85.0 to 97.5 wt %, 87.5 to 95.0 wt %, about 90.0 to about 99.0 wt % of at least one PE1-type polyethylene.

Optionally, the first and second outer layers may additionally include at least one PE2-type and/or at least one PE3-type polyethylene. Typically, the total amount of the PE2- and/or PE3-type polyethylenes in the first and second outer layers is, independently, ≤20.0 wt %, e.g., ≤about 17.5 wt %, ≤about 15.0 wt %, ≤about 12.5 wt %, ≤about 10.0 wt %, ≤about 5.0 wt %, ≤about 2.5 wt %, or about 0 wt %. The total amount of the PE2- and/or PE3-type polyethylenes in the first and second outer layers may be, independently, ≥0 wt %, e.g., ≥about 2.5 wt %, ≥about 5.0 wt %, ≥about 7.5 wt %, ≥about 10.0 wt %, ≥about 12.5 wt %, ≥about 15.0 wt %, or ≥about 17.5 wt %. Ranges of the total amount of the PE2- and/or PE3-type polyethylenes expressly disclosed include, but are not limited to, ranges formed by combinations any of the above-enumerated values, e.g., 0 to about 20.0 wt %, 0 to about 17.5 wt %, 0 to about 15.0 wt %, 0 to about 12.5 wt %, 0 to about 10.0 wt %, 0 to about 7.5 wt %, 0 to about 5.0 wt %, 0 to about 2.0 wt %, about 0 wt %, etc.

Amounts of the PE1-, PE2-, and PE3-type polyethylenes are based on the amount of PE1-, PE2-, and PE3-type polyethylenes in the first or second outer layer, as the case may be.

Inner Layer Composition

The multilayer films described herein have an inner layer positioned between the first and second outer layers. Generally, the inner layer comprises ≥about 5.0 wt % propylene-based elastomer according to any embodiment describe herein, e.g., ≥about 7.5, ≥about 10.0, ≥about 12.5, ≥about 15.0, ≥about 17.5, ≥about 20.0, ≥about 22.5, or ≥about 25.0 wt % propylene-based elastomer. Additionally or alternatively, the inner layer comprises ≤about 30.0 wt % propylene-based elastomer, e.g., ≤about 25.0 wt %, ≤about 22.5 wt %, ≤about 20.0 wt %, ≤about 17.5 wt %, ≤about 15.0 wt %, or ≤about 12.5 wt %. Ranges of the amount of the propylene-based elastomer expressly disclosed include, but are not limited to, ranges formed by combinations of any of the above-enumerated values, e.g., about 5.0 to about 30.0 wt %, about 7.5 to about 25.0 wt %, about 10.0 to about 22.5 wt %, about 12.5 to about 20.0 wt %, about 15.0 to about 17.5 wt %, etc.

The inner layer also includes ≥about 70 wt % of a PE2-type polyethylene, e.g., ≥about 72.5 wt %, ≥about 75 wt %, ≥about 77.5 wt %, ≥about 80.0 wt %, ≥about 85.0 wt %, ≥about 87.5 wt %, ≥about 90 wt %, ≥about 92.5 wt % of a PE2-type polyethylene. Additionally or alternatively, the PE2-type polyethylene may be present in an amount ≤about 95.0 wt %, e.g., ≤about 92.5 wt %, ≤about 90.0 wt %, ≤about 87.5 wt %, ≤about 85.0 wt %, ≤about 82.5 wt %, ≤about 80.0 wt %, ≤about 77.5 wt %, ≤about 75.0 wt %, or ≤about 72.5 wt %. Ranges of the amount of the PE2-type polyethylene expressly disclosed include, but are not limited to, ranges formed by combinations of any of the above-enumerated values, e.g., about 70 to about 95 wt %, about 72.5 to about 92.5 wt %, about 75.0 to about 90.0 wt %, about 77.5 to about 87.5, about 80.0 to about 85.0 wt %, about 82.5 wt %, etc.

Optionally, the inner layer may include one or more PE1- and/or PE3-type polyethylenes. Typically, the total amount of the PE1- and/or PE3-type polyethylenes in the inner layer is ≤20.0 wt %, e.g., ≤about 17.5 wt %, ≤about 15.0 wt %, ≤about 12.5 wt %, ≤about 10.0 wt %, ≤about 5.0 wt %, ≤about 2.5 wt %, or about 0 wt %. The total amount of the PE1- and/or PE3-type polyethylenes in the inner layer may be ≥0 wt %, e.g., ≥about 2.5 wt %, ≥about 5.0 wt %, ≥about 7.5 wt %, ≥about 10.0 wt %, ≥about 12.5 wt %, ≥about 15.0 wt %, or ≥about 17.5 wt %. Ranges of the total amount of the PE1- and/or PE3-type polyethylenes expressly disclosed include, but are not limited to, ranges formed by combinations of any of the above-enumerated values, e.g., 0 to about 20.0 wt %, 0 to about 17.5 wt %, 0 to about 15.0 wt %, 0 to about 12.5 wt %, 0 to about 10.0 wt %, 0 to about 7.5 wt %, 0 to about 5.0 wt %, 0 to about 2.0 wt %, about 0 wt %, etc.

Amounts of the propylene-based elastomer and PE2-type polyethylene in the inner layer are based on the amount of propylene-based elastomer, PE1-, PE2-, and PE3-type polyethylenes in the inner layer.

Films

The inventive films can be made by any suitable method known, e.g., co-extruding the three layers together in the desired compositions and thicknesses. Examples of methods of making the films include tentered or blown processes, LISIM™, and others. Further, the working conditions, temperature settings, lines speeds, etc. will vary depending on the type and the size of the equipment used. Nonetheless, described generally here is one method of making the films described throughout this specification. The various materials that make up the film layers are melt blended and coextruded, such as through a 3, 4, 5, 7-layer or more die head, into the desired film structure. A preferred method of making the films described herein is by cast extrusion or blown film extrusion, both of which are well known in the art.

Typically, blown film extrusion is carried out vertically upwards, however horizontal and downward extrusion processes are now becoming more common. Exemplary multilayer films may be prepared by a) providing first and second outer layers comprising 80 to 100 wt % of a first ethylene-based polymer; b) providing an inner layer interposing the first and second outer layers, the inner layer comprising 5.0 to 30.0 wt % of a first propylene-based elastomer and 70.0 to 95.0 wt % a second polyethylene, said second ethylene-based having a Composition Distribution Breadth Index (CDBI) of at least 70% and a $g'_{vis}$ of 0.85 to 0.98; and c) forming the inner layer and first and second outer layers into a film at an air-ring height to die-diameter ratio of 1.0 to 2.0., e.g., 1.2 to 2.0; 1.2 to 1.8, 1.2 to 1.6, 1.2 to 1.4, 1.2 to 1.3, 1.3 to 2.0, 1.3 to 1.8, 1.3 to 1.6, 1.3 to 1.5 1.3 to 1.4, 1.4 to 2.0, 1.4 to 1.8, 1.4 to 1.6, 1.4 to 1.5, 1.5 to 2.0, 1.5 to 1.8, 1.5 to 1.6, 1.6 to 2.0, 1.6 to 1.8, or 1.8 to 2.0.

In more specific embodiments, the method may include the following steps:

1. The polymer material starts in a pellet form, which are successively compacted and melted to form a continuous, viscous liquid. This molten plastic is then forced, or extruded, through an annular die.
2. Air is injected through a hole in the center of the die, and the pressure causes the extruded melt to expand into a bubble. The air entering the bubble replaces air leaving it, so that even and constant pressure is maintained to ensure uniform thickness of the film.
3. The bubble is pulled continually upwards from the die and a cooling ring blows air onto the film. The film can also be cooled from the inside using internal bubble cooling. This reduces the temperature inside the bubble, while maintaining the bubble diameter.
4. After solidification at the frost line, the film moves into a set of nip rollers which collapse the bubble and flatten it into two flat film layers. The puller rolls pull the film onto windup rollers. The film passes through idler rolls during this process to ensure that there is uniform tension in the film. Between the nip rollers and the windup rollers, the film may pass through a treatment center, depending on the application. During this stage, the film may be slit to form one or two films, or surface treated.

In the cast extrusion process, the various polyolefins that make up the layers may be extruded in a molten state through a flat die and then cooled. Alternatively, the copolymers may be extruded in a molten state through an annular die and then blown and cooled to form a tubular film. The tubular film may be axially slit and unfolded to form a flat film. The films of the invention may be unoriented, uniaxially oriented or biaxially oriented, Physical properties of the film may vary depending on the film forming techniques employed.

Polymers may be coextruded through a coextrusion feedblock and die assembly to yield a film with two or more layers adhered together but differing in composition. Multiple-layer films may also be formed by extrusion coating whereby a substrate material is contacted with the hot molten polymer as the polymer exits the die. For instance, an already formed polyethylene film may be extrusion coated with a copolymer film as the latter is extruded through the die. Multiple-layer films may also be formed by combining two or more single layer films prepared as described above.

Films described herein can be used for any purpose, but are particularly suited to stretch hood applications. Exemplary films may have one or more of the following properties:

Some embodiments have a positive slope in the stress vs. strain plot after $1^{st}$ yield. A "positive slope after $1_{st}$ yield" as used herein means that the slope of a line determined from the linear regression of the (stress, % elongation) coordinate pairs is a number >0, e.g., about $1.30 \times 10^4$ to about $2.75 \times 10^4$ pascal/% elongation, about $1.50 \times 10^4$ to about $2.5 \times 10^4$ pascal/% elongation, about $1.70 \times 10^4$ to about $2.25 \times 10^4$ pascal/% elongation, about $1.90 \times 10^4$ to about $2.10 \times 10^4$ pascal/% elongation. The slope should be determined from (stress, % elongation) coordinate pairs between % elongation values of 25% elongation to the local maximum in the vs. strain plot occurring before 80% elongation. A minimum of 10 data points should be used. The term "positive slope" should not be interpreted to mean the stress vs. strain plot itself displays a strictly linear or function-based behavior.

Some films described herein have a negative slope in the stress vs. strain plot after $2^{nd}$ yield. A "negative slope after 2nd yield" as used herein means that the slope of a line determined from the linear regression of the (stress, % elongation) coordinate pairs is a number <0, e.g., about −690 to about $-2.10 \times 10^4$ Pascal/% elongation, about $-1.00 \times 10^3$ to about $-2.00 \times 10^4$ Pascal/% elongation, about $-3.00 \times 10^3$ to about $-1.80 \times 10^4$ Pascal/% elongation, about $-5.00 \times 10^3$ to about $-1.60 \times 10^4$ Pascal/% elongation, about $-7.00 \times 10^3$ to about $-1.40 \times 10^4$ Pascal/% elongation, about $-9.00 \times 10^3$ to about $-1.20 \times 10^4$ Pascal/% elongation, or about $-1.00 \times 10^4$ to about $-1.10 \times 10^4$ Pascal/% elongation. The slope should be determined from (stress, % elongation) coordinate pairs between % the local maximum in the vs. strain plot occurring before 80% elongation and the minimum value between 80 and 200% elongation. A minimum of 10 data points should be used. The term "negative slope" should not be interpreted to mean the stress vs. strain plot itself displays a strictly linear or function-based behavior.

Some films are also characterized by the relative difference in the tensile stress, ΔT, between the stress at the local maximum and minimum values between 80 and 200% elongation. The difference may be ≥about 0.1 MPa, e.g., ≥about 0.2 MPa, ≥about 0.3 MPa, ≥about 0.4 MPa, ≥about 0.5 MPa, ≥about 0.6 MPa, or ≥about 0.75 MPa. Additionally or alternatively, the difference may be ≤about 1.0 MPa, e.g., ≤about 0.75 MPa, ≤about 0.6 MPa, ≤about 0.5 MPa, ≤about 0.4 MPa, ≤about 0.3 MPa, or ≤about 0.2 MPa. Ranges of this difference that expressly disclosed include, but are not limited to, ranges formed by combinations any of the above-enumerated values, e.g., about 0.1 to about 1.0 MPa, about 0.2 to about 0.75 MPa, about 0.3 to about 0.6 MPa, about 0.4 to about 0.5 MPa, etc.

This difference may also be expressed as a percentage change of the tensile stress relative to the local maximum stress in the region between 80 and 200% elongation, i.e., %=(ΔT/Tmax), where Tmax is the local maximum value in the tensile stress in the region between 80 and 200% elongation. Some films have a ΔT/Tmax value ≥about 1.0%, e.g., ≥about 2.0%, ≥about 3.0%, ≥about 4.0%, ≥about 5.0%, ≥about 6.0%, ≥about 7.5%, or ≥about 9.0%. Additionally or alternatively, the ΔT/Tmax may be ≤about 10.0%, e.g., ≤about 9.0%, ≤about 7.5%, ≤about 6.0%, ≤about 5.0%, ≤about 4.0%, ≤about 3.0%, or ≤about 2.0%. Ranges of this ΔT/Tmax value that expressly disclosed include, but are not limited to, ranges formed by combinations any of the above-enumerated values, e.g., about 1.0 to about 10.0%, about 2.0 to about 9.0%, about 3.0 to about 7.5%, about 4.0 to about 6.0%, about 5.0%, etc.

The thickness of the film is not particularly limited and may vary based upon the application desired. Exemplary films have a thickness ≥about 10 μm, e.g., ≥about 50 μm, ≥about 75 μm, ≥about 90 μm, ≥about 100 μm, ≥about 110 μm, ≥about 125 μm, ≥about 150 μm, or ≥about 750 μm. Additionally or alternatively, the thickness may be ≤about 1000 μm, e.g., ≤about 750 μm, ≤about 150 μm, ≤about 125 μm, ≤about 110 μm, ≤about 100 ≤about 90 μm, ≤about 75 μm, or ≤about 50 μm. %. Ranges of film thickness expressly disclosed include, but are not limited to, ranges formed by combinations any of the above-enumerated values, e.g., about 10 to about 1000 μm, about 50 to about 750 μm, about 75 to about 150 μm, about 90 to about 125 μm, about 90 to about 110 μm, about 100 μm, etc.

The MD 1% Secant Modulus may be ≥137 MPa, e.g., ≥about 140 MPa, ≥about 155 MPa, ≥about 160 MPa, ≥about 170 MPa, ≥about 180 MPa, ≥about 190 MPa, ≥about 200 MPa, ≥about 205 MPa. Additionally or alternatively, the 1% Secant Modulus may be ≤about 207 MPa, e.g., ≤about 205 MPa, ≤about 190 MPa, ≤about 180 MPa, ≤about 170 MPa, ≤about 160 MPa, ≤about 155 MPa, or ≤about 140 MPa. Ranges of MD 1% Secant Modulus expressly disclosed include, but are not limited to, ranges formed by combinations any of the above-enumerated values, e.g., about 137 to about 207 MPa, about 140 to about 205 MPa, about 155 to about 200 MPA, about 155 to 190 MPa, about 160 to about 180 MPa, about 170 MPa, etc.

Some films may have a TD Tensile Stress of ≥about 14.0 MPa at 400% elongation, e.g., ≥about 14.0 MPa, ≥about 14.5 MPa, ≥about 15.0 MPa, ≥about 15.5 MPa, ≥about 16.0 MPa, ≥about 17.0 MPa, or ≥about 18.0 MPa, at 400% elongation. The TD Tensile Stress may be ≤about 20 MPa at 400% elongation, e.g., ≤about 19.0 MPa, ≤about 18.0 MPa, ≤about 17.0 MPa, ≤about 16.0 MPa, ≤about 15.5 MPa, ≤about 15.0 MPa, or ≤about 14.5 MPa. Ranges of TD Tensile Stress at 400% elongation expressly disclosed include, but are not limited to, ranges formed by combinations any of the above-enumerated values, e.g., about 14.0 to about 20.0 MPa, about 14.5 to about 19.0 MPa, about 15.0 to about 18.0 MPa, about 15.5 to about 17.0 MPa, about 16.0 MPa, etc.

Exemplary films may have a Peak Load of ≥about 50.0 Newtons, e.g., ≥about 52.0 Newtons, ≥about 54.0 Newtons, ≥about 56.0 Newtons, ≥about 58.0 Newtons, ≥about 60.0 Newtons, ≥about 65.0 Newtons, ≥about 70.0 Newtons, ≥about 75.0 Newtons. Some films may have a Peak Load of ≤about 80.0 Newtons, e.g., ≤about 75.0 Newtons, ≤about 70.0 Newtons, ≤about 65 Newtons, ≤about 60.0 Newtons, ≤about 58.0 Newtons, ≤about 56.0 Newtons, ≤about 54.0 Newtons, or ≤about 52.0 Newtons. Ranges of Peak Load expressly disclosed include, but are not limited to, ranges formed by combinations any of the above-enumerated values, e.g., about 50.0 to about 80.0 Newtons, about 52.0 to about 75.0 Newtons, about 54.0 to about 70.0 Newtons, about 56.0 to about 60.0 Newtons, etc.

Exemplary films may additionally or alternatively have a Dart Impact Value of ≥about 7.0 g/μm, e.g., ≥about 7.5 g/μm, ≥about 8.0 g/μm, ≥about 8.5 g/μm, ≥about 9.0 g/μm, ≥about 9.5 g/μm, ≥about 10.0 g/μm, or ≥about 11.0 Wm. The Dart Impact Value of multilayer films described herein may be ≤about 12.0 g/μm, e.g., ≤about 11.0 g/μm, ≤about 10.0 g/μm, ≤about 9.5 g/μm, ≤about 9.0 g/μm, ≤about 8.5 g/μm, ≤about 8.0 g/μm, ≤about 7.5 g/μm, or ≤about 7.0 Wm. Ranges of Dart Impact Value expressly disclosed include, but are not limited to, ranges formed by combinations any of the above-enumerated values, e.g., about 7.0 to about 12.0 g/μm, about 7.5 to about 11.0 g/μm, about 8.0 to about 10.0 g/μm, about 8.5 to about 9.5 g/μm, about 9.0 g/μm, etc.

Additionally or alternatively, the multilayer films herein may have a MD Tensile Strength of ≥about 34.0 MPa, e.g., ≥about 38.0 MPa, ≥about 42.0 MPa, ≥about 46.0 MPa, ≥about 52.0 MPa, ≥about 56.0 MPa, ≥about 60.0 MPa. The MD Tensile Strength of some films may be ≤about 64.0 MPa, e.g., ≤about 60.0 MPa, ≤about 56.0 MPa, ≤about 52.0 MPa, ≤about 46.0 MPa, ≤about 42.0 MPa, or ≤about 38.0 MPa. Ranges of MD Tensile Strength expressly disclosed include, but are not limited to, ranges formed by combinations any of the above-enumerated values, e.g., about 34.0 to about 62.0 MPa, about 38.0 to about 60.0 MPa, about 42.0 to about 56.0 MPa, about 46.0 to about 52.0 MPa, etc.

Additionally or alternatively, the multilayer films herein may have a TD Tensile Strength of ≥about 34.0 MPa, e.g., ≥about 38.0 MPa, ≥about 42.0 MPa, ≥about 46.0 MPa, ≥about 52.0 MPa, ≥about 56.0 MPa, ≥about 60.0 MPa. The TD Tensile Strength of some films may be ≤about 64.0 MPa, e.g., ≤about 60.0 MPa, ≤about 56.0 MPa, ≤about 52.0 MPa, ≤about 46.0 MPa, ≤about 42.0 MPa, or ≤about 38.0 MPa. Ranges of TD Tensile Strength expressly disclosed include, but are not limited to, ranges formed by combinations any of the above-enumerated values, e.g., about 34.0 to about 62.0 MPa, about 38.0 to about 60.0 MPa, about 42.0 to about 56.0 MPa, about 46.0 to about 52.0 MPa, etc.

Some films may also possess advantageous sealing properties, e.g., low seal initiation temperature. Some films may have a seal initiation temperature of ≤about 105° C., e.g., ≤about 103° C., ≤about 101° C., or ≤about 99° C. Additionally or alternatively, the seal initiation temperature may be ≥about 97° C., e.g., ≥about 99° C., ≥about 101° C., or ≥about 103° C. Ranges of seal initiation temperature expressly disclosed include, but are not limited to, ranges formed by combinations any of the above-enumerated values, e.g., about 97.0 to about 105° C., about 97.0 to about 103° C., about 97.0 to about 101° C., etc.

Additionally or alternatively, some films may be characterized by a seal strength at a seal temperature of ≤105° C., (e.g. 105° C., 103° C., 101° C., 99° C. or 97° C.) of ≥about 4.45 Newtons, e.g., ≥about 7.50 Newtons, ≥about 12.50 Newtons, ≥about 17.50 Newtons, ≥about 22.50 Newtons, ≥about 27.50 Newtons, or ≥about 30.00 Newtons. The seal strength at a seal temperature of ≤105° C. of ≤about 40.00 Newtons, e.g., ≤about 30.00 Newtons, ≤about 27.50 Newtons, ≤about 22.50 Newtons, ≤about 17.50 Newtons, ≤about 12.50 Newtons, or ≤about 7.50 Newtons. Ranges of seal strength at a temperature of ≤105° C. expressly disclosed include, but are not limited to, ranges formed by combinations any of the above-enumerated values, e.g., about 4.45 to about 40.00 Newtons, about 7.50 to about 30.00 Newtons, about 12.50 to about 27.50 Newtons, about 17.50 to about 22.50 Newtons, etc.

Particular Embodiments

Embodiment 1. A multilayer film, comprising: a) first and second outer layers comprising 80 to 100 wt % of a first ethylene-based polymer; and b) an inner layer interposing the first and second outer layers, the inner layer comprising 5.0 to 30.0 wt % of a first propylene-based elastomer and 70.0 to 95.0 wt % a second ethylene-based polymer, said second ethylene-based polymer having a Composition Distribution Breadth Index (CDBI) of at least 70% and a $g'_{vis}$ of 0.85 to 0.98; wherein the film is characterized by a MD 1% Secant Modulus of ≥137 MPa.

Embodiment 2. A method of making a multilayer film, comprising: a) providing first and second outer layers comprising 80 to 100 wt % of a first ethylene-based polymer; b) providing an inner layer interposing the first and second outer layers, the inner layer comprising 5.0 to 30.0 wt % of a first propylene-based elastomer and 70.0 to 95.0 wt % a second ethylene-based polymer, said second ethylene-based polymer having a Composition Distribution Breadth Index (CDBI) of at least 70% and a $g'_{vis}$ of 0.85 to 0.98; and c) forming the inner layer and first and second outer layers into a film at an air-ring height to die-diameter ratio of 1.0 to 2.0, preferably 1.2 to 1.8, 1.3 to 1.6, or 1.4 to 1.5.

Embodiment 3. Embodiment 1 or 2, wherein the first ethylene-based polymer has a $g'_{vis}$≥0.98 and a density of 0.910 to 0.950 g/cm$^3$, e.g., 0.910 to 0.930 g/cm$^3$ or 0.910 to 0.925 g/cm$^3$).

Embodiment 4. Any of Embodiments 1 to 3, wherein the second ethylene-based polymer has a density of 0.912 to 0.920 g/cm$^3$, 0.914 to 0.918 g/cm$^3$ or 0.915 to 0.917 g/cm$^3$, and a melt index, $I_2$, of 0.1 to 0.3 g/10 min., e.g., 0.15 to 0.25 g/10 min. or 0.18 to 0.22 g/10 min.

Embodiment 5. Any of Embodiments 1 to 4, wherein the propylene-based elastomer has a density of 0.850 to 0.920 g/cm$^3$, e.g., 0.860 to 0.900 g/cm$^3$, 0.860 to 0.880 g/cm$^3$, or 0.872 to 0.876 g/cm$^3$.

Embodiment 6. Any of Embodiments 1 to 5, wherein the propylene-based elastomer has a melt index, $I_2$, of 0.5 to 2.5 g/10 min., e.g., 0.75 to 2.25 g/10 min., 0.75 to 1.5 g/10 min., 0.90 to 1.3 g/10 min., or 1.0 to 1.2 g/10 min.

Embodiment 7. Any of Embodiments 1 to 6, wherein the propylene-based elastomer has a melt flow rate (MFR) of 1.0 to 5.0 g/10 min., e.g., 1.3 to 4.7 g/10 min., 1.5 to 4.0 g/10 min., 2.0 to 3.7 g/10 min., 2.3 to 3.5 g/10 min., 2.7 to 3.3 g/10 min., or 2.9 to 3.1 g/10 min.

Embodiment 8. Any of Embodiments 1 to 7, wherein the film is characterized by a TD Tensile Stress of ≥about 14.0 MPa at 400% elongation, e.g., about 14.0 to about 20.0 MPa, about 14.5 to about 19.0 MPa, about 15.0 to about 18.0 MPa, about 15.5 to about 17.0 MPa, about 16.0 MPa, measured at 400% elongation.

Embodiment 9. Any of Embodiments 1 to 8, wherein the film is characterized by a Peak Load of ≥50.0 Newtons, e.g., about 50.0 to about 80.0 Newtons, about 52.0 to about 75.0 Newtons, about 54.0 to about 70.0 Newtons, about 56.0 to about 60.0 Newtons.

Embodiment 10. Any of Embodiments 1 to 9, wherein the film is characterized by a Dart Impact value of ≥7.0 g/µm, e.g., about 7.0 to about 12.0 g/µm, about 7.5 to about 11.0 g/µm, about 8.0 to about 10.0 g/µm, about 8.5 to about 9.5 g/µm, or about 9.0 Wm.

Embodiment 11. Any of Embodiments 1 to 10, wherein the film is characterized by a MD Tensile Strength of ≥34.0 MPa, e.g., about 34.0 to about 62.0 MPa, about 38.0 to about 60.0 MPa, about 42.0 to about 56.0 MPa, about 46.0 to about 52.0 MPa.

Embodiment 12. Any of Embodiments 1 to 11, wherein the film is characterized by a TD Tensile Strength of ≥34.0 MPa, e.g., about 34.0 to about 62.0 MPa, about 38.0 to about 60.0 MPa, about 42.0 to about 56.0 MPa, about 46.0 to about 52.0 MPa.

Embodiment 13. Any of Embodiments 1 to 12, wherein the film is characterized by a seal initiation temperature of ≤105° C., e.g., ≤103° C., ≤101° C., ≤99° C., or ≤97° C.

Embodiment 14. Any of Embodiments 1 to 13, wherein the film is characterized by a seal strength of ≥4.45 Newtons, e.g., about 4.45 to about 40.00 Newtons, about 7.50 to about 30.00 Newtons, about 12.50 to about 27.50 Newtons, about 17.50 to about 22.50 Newtons, measured a at a seal temperature of ≤105° C.

Embodiment 15. Any of Embodiments 1 to 14, wherein the film is characterized by stress-strain curve having a slope of $1.30 \times 10^4$ to $2.75 \times 10^4$ Pascal/% elongation at first yield.

Embodiment 16. Any of Embodiments 1 to 15, wherein the film is characterized by stress-strain curve having a slope of $-690$ to $-2.10 \times 10^4$ Pascal/% elongation at second yield.

Embodiment 17. Any of Embodiments 1 to 16, wherein the film is characterized by a MD 1% Secant Modulus of ≥137 MPa, e.g., about 137 to about 207 MPa, about 140 to about 205 MPa, about 155 to about 200 MPA, about 155 to 190 MPa, about 160 to about 180 MPa, about 170 MPa.

EXAMPLES

Test Methods

The properties described herein can be determined in accordance with the following test procedures. Where any of these properties is referenced in the appended claims, it is to be measured in accordance with the specified test procedure.

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Mw/Mn: The expression $M_w/M_n$ is the ratio of the weight average molecular weight ($M_w$) to the number average molecular weight ($M_n$), also referred to as the molecular weight distribution (MWD). The weight average molecular weight is given by:

$$M_w = \frac{\sum_i n_i M_i^2}{\sum_i n_i M_i}$$

The number average molecular weight is given by:

$$M_n = \frac{\sum_i n_i M_i}{\sum_i n_i}$$

The z-average molecular weight is given by:

$$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in *Macromolecules*, Vol. 34, No. 19, p. 6812 (2001).

Composition Distribution Breadth Index (CDBI): CDBI is generally the weight percent of the ethylene-based polymer having a comonomer content within ±25% of the median comonomer content. The CDBI of a copolymer is readily determined utilizing well known techniques for isolating individual fractions of a sample of the copolymer. One such technique is Temperature Rising Elution Fractionation (TREF), as described in Wild, et al., J. *Poly. Sci. Poly. Phys. Ed.*, vol. 20, p. 441 (1982), which is incorporated herein by reference.

To determine CDBI, a solubility distribution curve is first generated for the copolymer. This may be accomplished using data acquired from TREF techniques described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions less than 15,000 are ignored. These low weight fractions generally represent a trivial portion of the plastomer of the present invention. The remainder of this description and the appended claims maintain this convention of ignoring weight fractions below 15,000 in the CDBI measurements.

From the further details of determining CDBI of a copolymer are known to those skilled in the art, see, for example, International Patent Application No. WO 93/03093, published Feb. 18, 1993.

Melt index is determined according to ASTM D-1238-E (190° C./2.16 kg), also sometimes referred to as $I_2$ or $I_{2.16}$. Melt Flow Rate or MFR is also determined according to ASTM D-1238, but at a temperature of 230° C. using a 2.16 kg mass (i.e., 230° C./2.16 kg).

Gauge or Thickness, reported in µm, is measured using a Measuretech Series 200 instrument. The instrument measures film thickness using a capacitance gauge. For each film sample, ten film thickness data points are measured per inch of film as the film is passed through the gauge in a transverse direction. From these measurements, an average gauge measurement is determined and reported.

Elmendorf Tear, reported in grams (g) or grams per µm (g/µm), is measured as specified by ASTM D-1922.

Tensile Strength at Yield, reported in pounds per square inch (MPa), is measured as specified by ASTM D-882.

Tensile Strength at Break, reported in pounds per square inch (MPa), is measured as specified by ASTM D-882.

Tensile Strength at Elongation, reported in pounds per square inch (MPa), is measured as specified by ASTM D-882.

Ultimate Tensile Strength, reported in pounds per square inch (MPa), is measured as specified by ASTM D-882.

Elongation at Yield, reported as a percentage (%), is measured as specified by ASTM D-882.

Elongation at Break, reported as a percentage (%), is measured as specified by ASTM D-882.

1% Secant Modulus (M), is measured as specified by ASTM D-882.

Density, reported in grams per cubic centimeter (g/cm$^3$), is determined using chips cut from plaques compression molded in accordance with ASTM D-1928 Procedure C, aged in accordance with ASTM D-618 Procedure A, and measured as specified by ASTM D-1505.

Dart $F_{50}$, or Dart Drop Impact or Dart Drop Impact Value (DIS), reported in grams (g) and/or grams per mil (g/μm), is measured as specified by ASTM D-1709, method B, using a dart with a stainless steel head.

Peak Puncture Force is determined according to ASTM D-3763.

Puncture. A probe puncture energy test is completed using an Instron Universal tester that records a continuous reading of the force (stress) and penetration (strain) curve. A 6 inch by 6 inch (15 cm by 15 cm) film specimen is securely mounted to a compression load cell to expose a test area 4 inches in diameter (10 cm). Two HDPE slip sheets each 2 inches by 2 inches (5 cm by 5 cm) and each approximately 0.25 mils (6.35 μm) thick are loosely placed on the test surface. A ¾ inch (1.875 cm) diameter elongated matte finished stainless steel probe, traveling at a constant speed of 10 inch/minute (35 cm/min) is lowered into the film, and a stress/strain curve is recorded and plotted. The "puncture force" is the maximum force encountered. The machine is used to integrate the area under the stress/strain curve, which is indicative of the energy consumed during the penetration to rupture testing of the film, and is reported as "puncture energy". The probe penetration distance is not recorded in these tests, unless specifically states to the contrary.

Seal Strength

Seal Strength is measured using a Theller Heat Sealer Model PC using a seal pressure of 0.5 MPa, a seal/dwell time of 1 second and a peel speed of 50.8 cm/min.

Hot tack is measured as follows. Films samples of 12.7 centimeters long in the MD direction are cut from a film roll. Backing tape is applied and the film is cut in 34.3 centimeter strips, across the film side-by-side so that the length of the tape lay in the MD direction and the work proceeds across in the TD direction. A tape roller is used to apply laminating pressure to the tape strips, anchoring them firmly to the sample specimen. Taped samples are then precision cut in the MD, across the web, with a dedicated 25.4 mm sample strip cutter. Hot tack is measured using a J&B Hot Tack Tester 3000 using the following conditions: seal pressure=0.5 N/mm sup.2, seal time=0.5 seconds, cool (delay) time=0.4 seconds, peel speed=200 mm/s, and sample width=25.4 mm The values reported are the average of four measurements. Seal initiation Temperature is defined as the temperature at which the seal formed in the manner described for the seal strength determination attains a seal strength of 4.45 Newtons.

Example Films

The exemplary blown films described are prepared and tested. Film formation parameters are reported in Table 1. Film properties are reported in Table 2.

Comparative Example 1

In Comparative Example 1, a 3-layer film comprising first and second outer layers and an interposing inner layer is prepared. The outer layers (20.3 μm) comprise Exceed™ 1018 metallocene polyethylene resin (a PE1-type polyethylene) having a melt index ($I_{2.16}$) of 1.0 g/10 min. and a density of 0.918 g/cm$^3$. The inner layer (61.0 μm) comprises Nexxstar™ 00111, a low density polyethylene resin (a PE3-type polyethylene) having a melt index ($I_{2.16}$) of 0.5 g/10 min. and a vinyl acetate content of about 7.5 wt %.

Comparative Example 2

In Comparative Example 2, Comparative Example 1 is substantially reproduced except that the inner layer comprises 85 wt % Nexxstar™ 00111 low density polyethylene resin and 15 wt % Vistamaxx™ 2030FL, a propylene based elastomer having a density of 0.874 g/cm3, a MFR of about 3.0 g/10 min., a melt index ($I_{2.16}$) of 1.1 g/10 min. and an ethylene content of about 11 wt %.

Example 3

In Example 3, Comparative Example 2 is substantially reproduced except that the inner layer comprises 90 wt % Enable™ 1602 metallocene polyethylene resin (a PE2-type polyethylene) having a melt index ($I_{2.16}$) of 0.2 g/10 min. and a density of 0.916 g/cm$^3$ and 10 wt % Vistamaxx™ 2030FL.

Example 4

In Example 4, Example 3 is substantially reproduced except that the inner layer comprises 80 wt % Enable™ 1602 metallocene polyethylene resin and 20 wt % Vistamaxx™ 2030FL.

Example 5

In Example 5, Example 3 is substantially reproduced except that the outer layers comprise 90 wt % Exceed™ 1012 metallocene polyethylene resin (a PE1-type polyethylene) having a melt index ($I_{2.16}$) of 1.0 g/10 min. and a density of 0.912 g/cm$^3$ and 10 wt % Enable™ 1602.

Example 6

In Example 6, Example 5 is substantially reproduced except that the outer layers comprise 80 wt % Exceed™ 1012 metallocene polyethylene resin and 20 wt % Enable™ 1602.

TABLE 1

| | Film Process Parameters | | | | | |
|---|---|---|---|---|---|---|
| | Comp. Ex. 1 | Comp. Ex. 2 | Ex. 3 | Ex. 4 | Ex. 5 | Ex. 6 |
| Die Diameter (mm) | 250.0 | 250.0 | 250.0 | 250.0 | 250.0 | 250.0 |
| Die Gap (μm) | 59.1 | 59.1 | 59.1 | 59.1 | 59.1 | 59.1 |
| Gauge (μm) | 3.97 | 3.99 | 3.98 | 3.99 | 4.02 | 4.06 |
| BUR | 3.1 | 3.2 | 3.2 | 3.2 | 3.2 | 3.2 |

TABLE 1-continued

| Film Process Parameters | | | | | | |
|---|---|---|---|---|---|---|
| | Comp. Ex. 1 | Comp. Ex. 2 | Ex. 3 | Ex. 4 | Ex. 5 | Ex. 6 |
| Lay Flat (cm) | 48.6 | 49.4 | 49.4 | 49.4 | 48.8 | 49.6 |
| Total Extrusion Rate (kg/hr.) | 371.4 | 372.4 | 369.6 | 371.2 | 372.0 | 371.7 |
| Die Factor (kg/mm-hr.)[a] | 1.20 | 1.20 | 1.20 | 1.20 | 1.20 | 1.20 |
| Frost Line Height (cm) | 34.0 | 34.0 | 34.0 | 44.0 | 44.0 | 44.0 |
| Line Speed (m/min., primary nip) | 40.1 | 39.5 | 39.5 | 39.6 | 39.4 | 39.0 |
| Air Ring Height (cm) | 8.9 | 9.0 | 13.2 | 13.2 | 12.0 | 12.0 |
| Drawdown Ratio | 4.7 | 4.6 | 4.6 | 4.6 | 4.7 | 4.5 |
| Strain Rate sec$^{-1}$ | 0.18 | 0.17 | 0.17 | 0.13 | 0.14 | 0.13 |

[a] the "mm" dimension refers to the die diameter

TABLE 2

| Film Properties | | | | | | |
|---|---|---|---|---|---|---|
| | Comp. Ex. 1 | Comp. Ex. 2 | Ex. 3 | Ex. 4 | Ex. 5 | Ex. 6 |
| Gauge (μm) | 100.73 | 101.35 | 100.58 | 100.84 | 101.09 | 102.36 |
| 1% Secant (MPa) | | | | | | |
| MD | 128.54 | 125.88 | 176.19 | 162.34 | 146.93 | 143.04 |
| TD | 124.55 | 125.73 | 178.27 | 159.75 | 147.99 | 139.84 |
| Tensile Properties | | | | | | |
| Yield Strength (MPa) | | | | | | |
| MD | 6.647 | 6.550 | 8.005 | 8.129 | 7.591 | 7.391 |
| TD | 6.715 | 6.729 | 8.432 | 8.301 | 7.743 | 7.288 |
| Elongation @ Yield (%) | | | | | | |
| MD | 6.2 | 6.8 | 6.1 | 7.4 | 6.5 | 7.3 |
| TD | 6.5 | 6.9 | 7.2 | 7.8 | 6.9 | 7.5 |
| Tensile Strength (MPa) | | | | | | |
| MD | 31.78 | 33.94 | 48.60 | 45.05 | 49.48 | 50.01 |
| TD | 31.38 | 35.75 | 45.33 | 47.05 | 50.04 | 49.37 |
| Elongation @ Break (%) | | | | | | |
| MD | 767 | 747 | 712 | 710 | 650 | 647 |
| TD | 754 | 713 | 757 | 724 | 656 | 658 |
| Slope after 1$^{st}$ Yield (Pa/%) | 19119 | 18347 | 18223 | 16272 | 26579 | 23608 |
| Slope after 2$^{nd}$ Yield (Pa/%) | −9192 | −6060 | −12604 | −9708 | −11418 | −6598 |
| ΔT (MPa) | 0.234 | 0.220 | 0.634 | 0.462 | 0.186 | 0.131 |
| ΔT/Tmax (%) | 2.5 | 2.4 | 6.0 | 4.5 | 1.9 | 1.4 |
| Elmendorf Tear | | | | | | |
| MD (g) | 1234 | 1240 | 1060 | 1051 | 970 | 1171 |
| TD (g) | 1780 | 1864 | 1404 | 1452 | 1437 | 1860 |
| MD (g/μm) | 12.14 | 12.11 | 10.38 | 10.29 | 9.64 | 11.21 |
| TD (g/μm) | 17.93 | 18.12 | 13.82 | 14.25 | 14.18 | 17.90 |
| Haze (%) | 13 | 14 | 23 | 24 | 12 | 14 |
| Gloss (GU) | | | | | | |
| MD | 54 | 53 | 34 | 36 | 67 | 60 |
| TD | 53 | 52 | 34 | 35 | 68 | 60 |
| Dart Drop | | | | | | |
| (g) | 720 | 872 | >1376 | >1373 | 840 | 928 |
| (g/μm) | 7.18 | 8.60 | >13.6 | >13.6 | 7.95 | 9.07 |
| Puncture | | | | | | |
| Peak Force (N) | 115.83 | 102.04 | 125.62 | 119.39 | 135.94 | 127.35 |
| Peak Force (N/μm) | 1.150 | 1.007 | 1.249 | 1.184 | 1.345 | 1.244 |
| Break Energy (mm-Kg) | 776.7 | 657.3 | 783.1 | 754.3 | 885.7 | 822.2 |
| Break Energy (mm-Kg/μm) | 7.71 | 6.49 | 7.79 | 7.48 | 8.76 | 8.03 |
| Stretch Hood Performance | | | | | | |
| Peak Load (N) | 51.11 | 48.97 | 58.32 | 55.87 | 53.56 | 53.78 |
| Load @ 85% (N) | 25.04 | 24.15 | 27.76 | 26.82 | 26.60 | 26.82 |
| Extension @ No Load | 61.0 | 59.2 | 61.6 | 60.7 | 58.9 | 57.6 |
| Recovery (%) | 39.0 | 40.8 | 38.4 | 39.3 | 41.1 | 42.4 |
| Stress @ 100% (MPa) | 8.749 | 8.163 | 9.301 | 9.094 | 9.108 | 8.687 |

FIG. 1 illustrates the TD Tensile Stress of the representative films. As FIG. 1 shows, the tensile stress of the inventive films is higher than that of the comparative examples. Thus, the inventive films may provide improved recovery after over-stretching.

Figure 2:
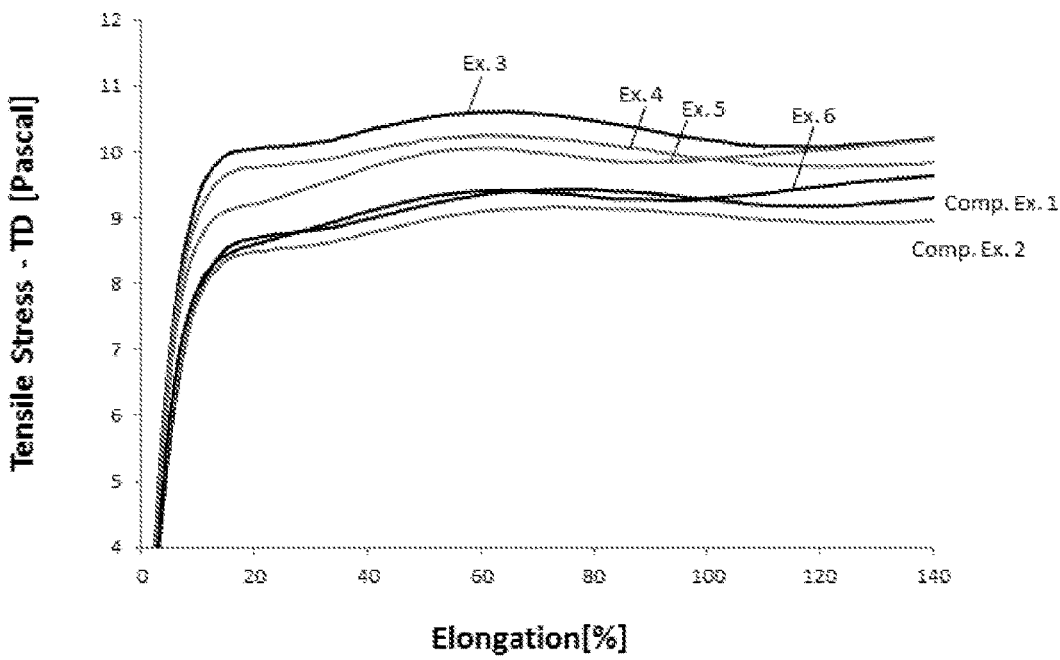
FIG. 2 illustrates the TD Tensile Stress of the representative films in the region of 0 to 140% elongation for exemplary films described herein.

FIG. 2 shows that in the region of 0 to 140% elongation the representative films have a higher TD Tensile Stress than the comparative films. FIG. 2 also more clearly illustrates the positive slope after first yield and the negative slope after the second yield. A negative slope indicates a reduced tendency of the film to wrinkle.

Figure 3:
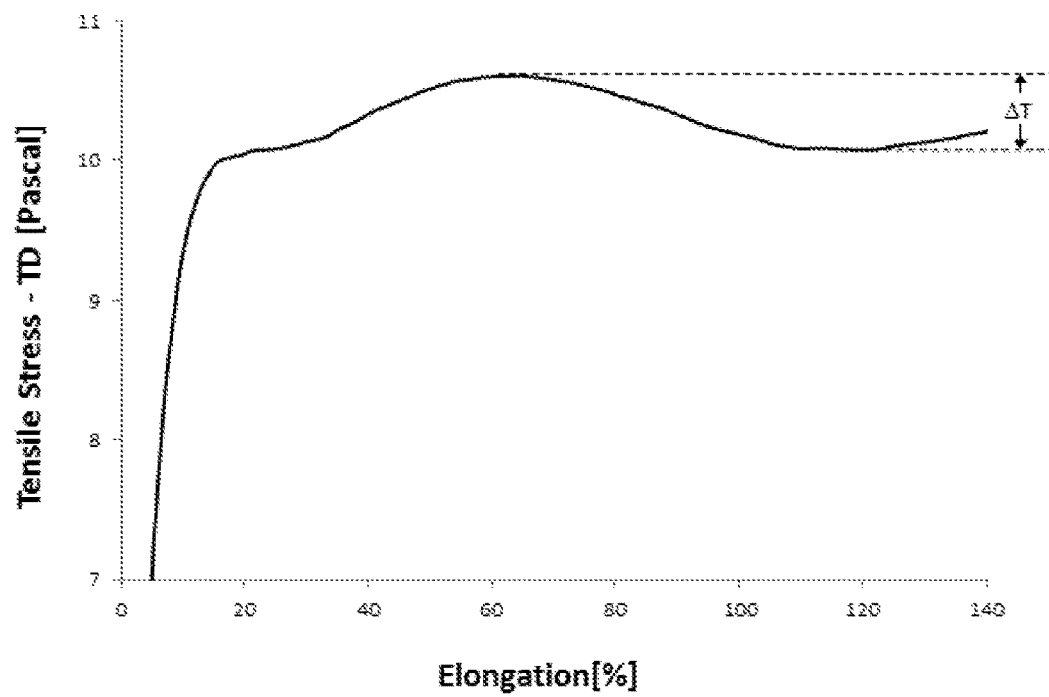
FIG. 3 illustrates the difference in the tensile stress, ΔT, between the local maximum and minimum values between 80 and 200% elongation for the film of Example 3.

FIG. 3 illustrates the difference in the tensile stress, ΔT, between the local maximum and minimum values between 80 and 200% elongation for Example 3.

Figure 4:
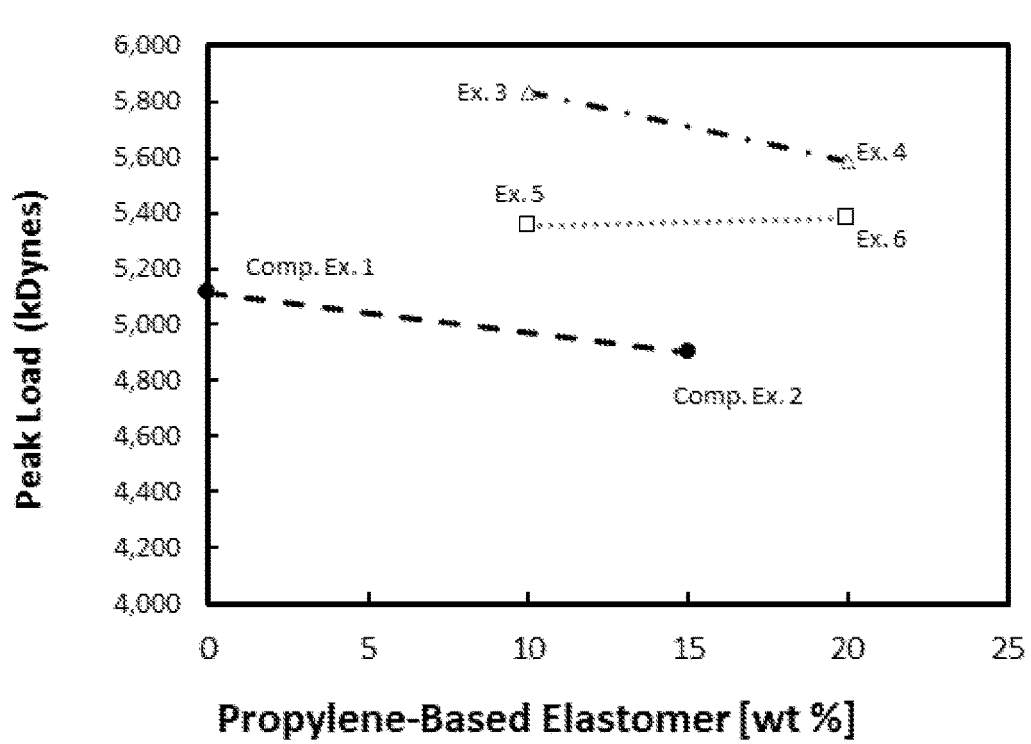
FIG. 4 illustrates the Peak Load performance of exemplary films described herein.

FIG. 4 illustrates the improvement in Peak Load performance of exemplary films. In each of the Examples 3-6, the peak load is greater than that of Comparative Examples 1 and 2. Thus, some inventive films may have the advantage of holding their shape better. The Peak Load of Examples 3 and 4 is greater than that of Examples 5 and 6. Without wishing to be held to any particular theory, this is believe to be due at least in part to the presence of first and second outer layers having a higher density than those of Examples 5 and 6.

Figure 5:
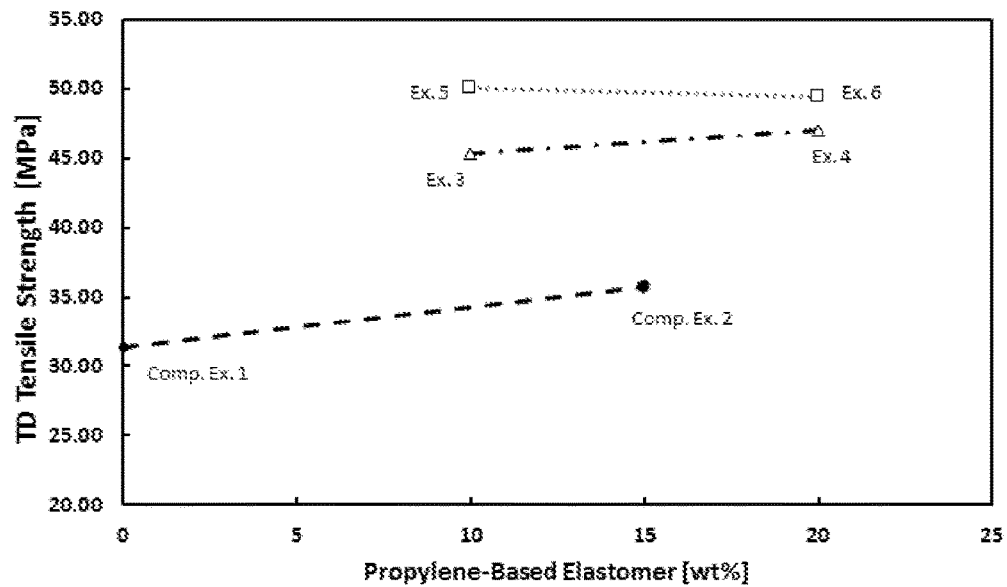
FIG. 5 illustrates that the TD Tensile Strength of exemplary films described herein.

FIG. 5 illustrates that the TD Tensile Strength of the exemplary films is improved compared to that of Comparative Examples 1 and 2 having and LDPE-based inner layer. Interestingly, the films of Examples 5 and 6 display relatively better TD Tensile Strength performance compared to Examples 3 and 4 as well as Comparative Examples 1 and 2 despite the presence of lower density first and second outer layers. A higher TD Tensile Strength is indicative of a film that is stronger in the TD direction.

Figure 6:
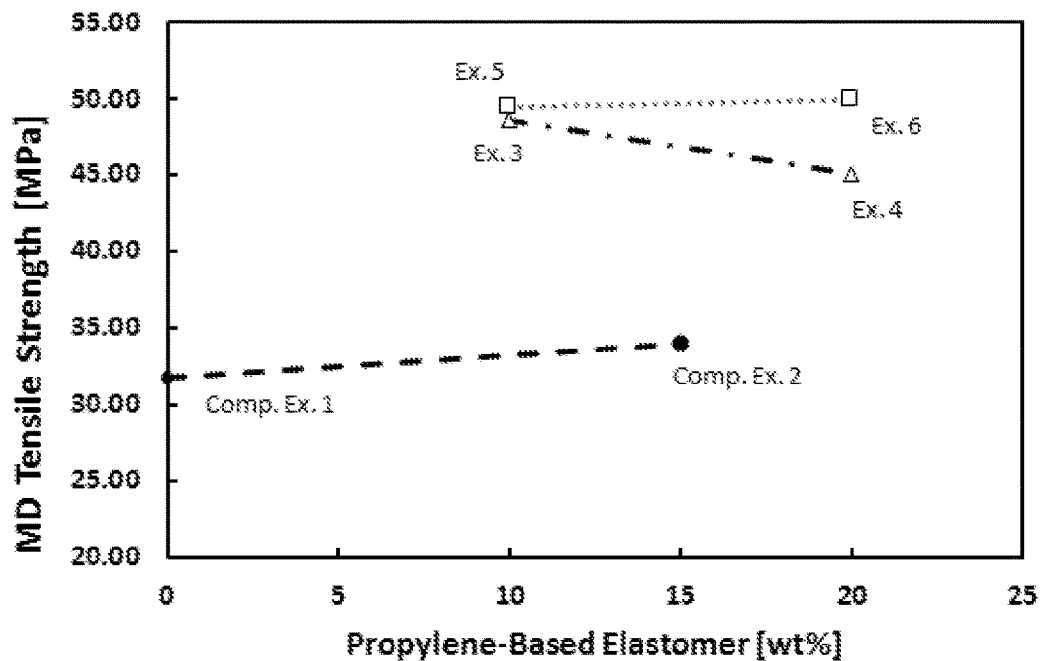
FIG. 6 illustrates that the MD Tensile Strength of exemplary films described herein.

FIG. 6 illustrates that the MD Tensile Strength of the exemplary films is also improved relative to that of Comparative Examples 1 and 2 which having the LDPE-based inner layer. Like the TD Tensile Strength, the MD Tensile Strength of the films of Examples 5 and 6 is better than that of Examples 3 and 4, despite the presence of lower density first and second outer layers. Thus, some films described herein may provide higher strength in the MD direction.

Figure 7:
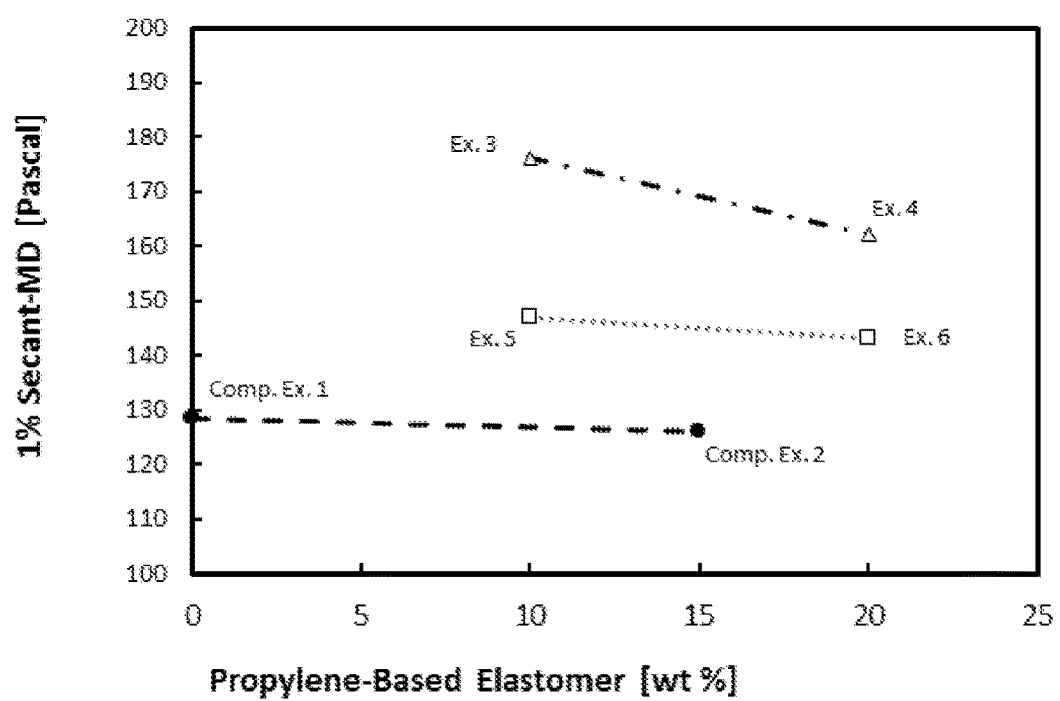
FIG. 7 illustrates the 1% Secant Modulus of exemplary films described herein.
Figure 8:
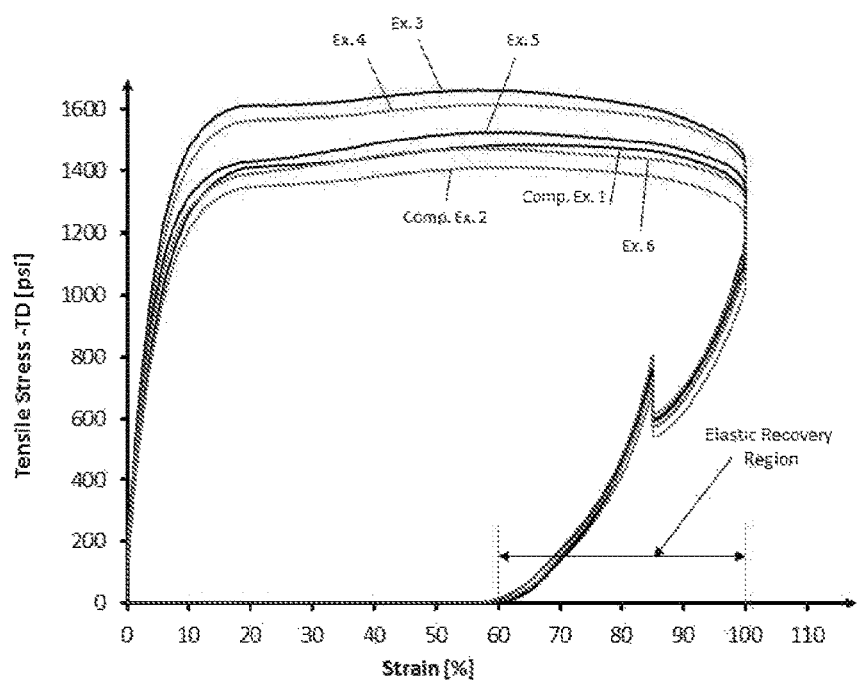
FIG. 8 illustrates the Tensile Stress-Strain hysteresis performance of exemplary films described herein.

FIG. 7 illustrates that the exemplary film of Examples 3-6 each display improved stiffness as measured by the 1% Secant Modulus compared with Comparative Examples 1 and 2. While the toughness of Examples 5 and 6 is slightly less than that of Examples 3 and 4, without wishing to be held to any particular theory, this is believed to be due to the presence of the higher density outer layers in Examples 3 and 4. Thus, some films may have improved stiffness and/or the ability to be down gauge to a higher degree than the comparative films.

Figure 9:
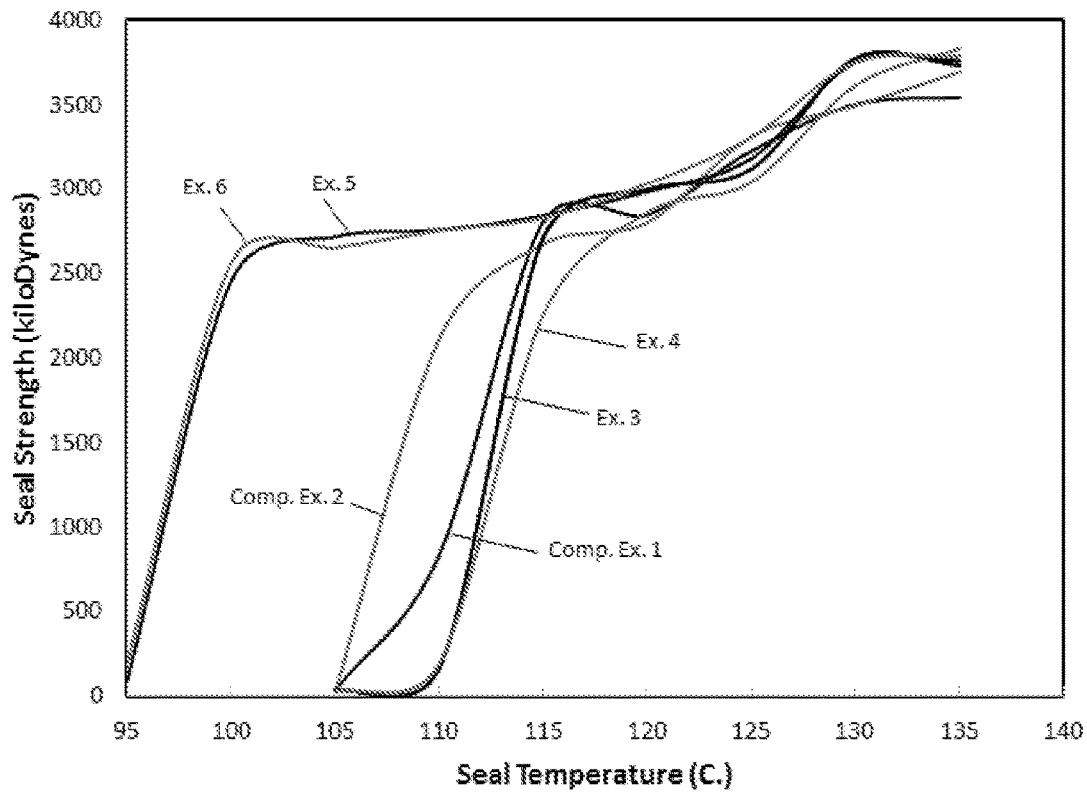
FIG. 9 illustrates the heat seal performance of exemplary films described herein.

The exemplary film of Examples 3-6 show desirable, if not relatively better stretch hood performance as indicated by the TD Stress-Strain hysteresis graph shown in FIG. 9. Particularly films of Examples 3-5 show higher TD stress in the elastic recovery region. Thus, the exemplary films have a higher holding force and are more likely to be able to hold wrapped articles more firmly in place than the films of the Comparative Examples.

The films are also tested for their heat sealing capabilities. The results of these tests are reported in Table 3. These results are represented graphically in FIG. 10.

TABLE 3

Heat Seal Performance

| Temp (C.) | Comp. Ex. 1 Seal Str. (N) | Comp. Ex. 2 Seal Str. (N) | Ex. 3 Seal Str. (N) | Ex. 4 Seal Str. (N) | Ex. 5 Seal Str. (N) | Ex. 6 Seal Str. (N) |
|---|---|---|---|---|---|---|
| 95 | | | | | 0.93 | 1.96 |
| 100 | | | | | 24.60 | 25.67 |
| 105 | 0.36 | 0.27 | 0.36 | 0.31 | 27.18 | 26.51 |
| 110 | 8.36 | 21.17 | 1.69 | 1.96 | 27.58 | 27.53 |
| 115 | 28.02 | 26.73 | 27.09 | 22.55 | 28.42 | 28.29 |
| 120 | 28.47 | 28.02 | 29.98 | 28.60 | 29.85 | 30.34 |
| 125 | 32.29 | 33.14 | 31.23 | 30.43 | 31.85 | 33.09 |
| 130 | 35.05 | 34.96 | 37.77 | 36.16 | 37.54 | 37.54 |
| 135 | 35.45 | 36.96 | 37.37 | 38.34 | 37.63 | 37.90 |

As the heat seal performance data show, the films of Examples 3-6 have heat seal capabilities at least comparable to those of Comparative Examples 1 and 2. Examples 5 and 6, in particular display improved heat seal capabilities. Thus, providing films with additional flexibility and improved combination of properties for applications requiring high seal strength and or low seal initiation temperatures.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of", or "is" preceding the recitation of the composition, element, or elements and vice versa.

What is claimed is:

1. A multilayer film, consisting of:
   a. first and second outer layers comprising 80 to 100 wt % of a first ethylene-based polymer, wherein said first ethylene-based polymer has a $g'_{vis} \geq 0.98$ and a density of 0.910 to 0.950 g/cm$^3$; and
   b. an inner layer interposing the first and second outer layers, the inner layer comprising 5.0 to 30.0 wt % of a first propylene-based elastomer, said propylene-based elastomer having a density of 0.850 to 0.920 g/cm$^3$, and 70.0 to 95.0 wt % a second ethylene-based polymer, said second ethylene-based polymer having a Composition Distribution Breadth Index (CDBI) of at least 70%, a $g'_{vis}$ of 0.85 to 0.98, and a density of 0.912 to 0.920 g/cm$^3$;
   wherein the film has a MD 1% Secant Modulus of $\geq 137$ MPa.

2. The multilayer film of claim 1, wherein the propylene-based elastomer has a melt index, $I_2$, of 0.5 to 2.5 g/10 min.

3. The multilayer film of claim 1, wherein the propylene-based elastomer has a melt flow rate (MFR) of 1.0 to 5.0 g/10 min.

4. The multilayer film of claim 1, characterized by a TD Tensile Stress of ≥ about 14.0 MPa at 400% elongation.

5. The multilayer film of claim 1, characterized by a Peak Load of ≥50.0 Newtons.

6. The multilayer film of claim 1, characterized by a Dart Impact value of ≥7.0 g/μm.

7. The multilayer film of claim 1, characterized by a MD Tensile Strength of ≥34.0 MPa.

8. The multilayer film of claim 1, characterized by a TD Tensile Strength of ≥34.0 MPa.

9. The multilayer film of claim 1, characterized by a seal initiation temperature of ≤105° C.

10. The multilayer film of claim 1, characterized by a seal strength of ≥4.45 Newtons at a seal temperature of ≤105° C.

11. The multilayer film of claim 1, characterized by stress-strain curve having a slope of $1.30 \times 10^4$ to $2.75 \times 10^4$ Pascal/% elongation at first yield.

12. The multilayer film of claim 1, characterized by stress-strain curve having a slope of $-690$ to $-2.10 \times 10^4$ Pascal/% elongation at second yield.

13. The multilayer film of claim 1, wherein the inner layer comprises 5.0 to 25.0 wt % of the first propylene-based elastomer.

14. The multilayer film of claim 1, wherein the inner layer comprises 5.0 to 20.0 wt % of the first propylene-based elastomer.

15. The multilayer film of claim 1, wherein the inner layer comprises 5.0 to 15.0 wt % of the first propylene-based elastomer.

16. The multilayer film of claim 1, wherein the inner layer comprises 5.0 to 12.5 wt % of the first propylene-based elastomer.

* * * * *